United States Patent
Buckley

(10) Patent No.: US 10,861,369 B2
(45) Date of Patent: Dec. 8, 2020

(54) RESOLUTION REDUCTION OF COLOR CHANNELS OF DISPLAY DEVICES

(71) Applicant: Facebook Technologies, LLC, Menlo Park, CA (US)

(72) Inventor: Edward Buckley, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/379,549

(22) Filed: Apr. 9, 2019

(65) Prior Publication Data

US 2020/0327842 A1 Oct. 15, 2020

(51) Int. Cl.
*G09G 3/20* (2006.01)
*F21V 8/00* (2006.01)
(Continued)

(52) U.S. Cl.
CPC ........... *G09G 3/2003* (2013.01); *G02B 6/005* (2013.01); *G02B 6/0023* (2013.01); *G02B 6/0091* (2013.01); *G02B 27/0172* (2013.01); *G06T 5/002* (2013.01); *G09G 3/32* (2013.01); *G02B 2027/014* (2013.01);
(Continued)

(58) Field of Classification Search
CPC .................. G09G 3/2003; G09G 3/32; G09G 2340/0407; G02B 6/0023; G02B 6/005; G02B 6/0091; G02B 27/0172; G02B 2027/0116; G02B 2027/014; G02B 2027/0178; G06T 5/002
See application file for complete search history.

(56) References Cited

U.S. PATENT DOCUMENTS 7,965,305 B2 6/2011 Miller et al.
2004/0080479 A1 4/2004 Credelle
(Continued)

FOREIGN PATENT DOCUMENTS

CN 104637972 A * 5/2015
WO WO2015081313 * 6/2015

OTHER PUBLICATIONS

Hirakawa, K. et al., "Fourier Domain Display Color Filter Array Design," 2007 IEEE International Conference on Image Processing, San Antonio, TX, 2007, pp. 429-432.
(Continued)

*Primary Examiner* — Phuc N Doan
(74) *Attorney, Agent, or Firm* — Fenwick & West LLP

(57) ABSTRACT

A display device may have multiple light emitter arrays. Each array may include multiple light emitters that emit light of a color. One or more of the arrays may have a reduced spatial resolution compared to other arrays as the size of the light emitters in the arrays with the reduced resolution may be larger than other light emitters. The display device may include one or more waveguides that converges light emitted from light emitters of different colors to form an image by overlapping the light at a spatial region. The display device may include an image processing unit that applies an anti-aliasing filter to reduce any visual effect perceived by users due to the reduced resolution in one or more color channels. The anti-aliasing filter may include convolution kernels that convolve input color values of different colors and may combine the convolution result for output color values of a color.

19 Claims, 14 Drawing Sheets

(51) Int. Cl.
*G02B 27/01* (2006.01)
*G06T 5/00* (2006.01)
*G09G 3/32* (2016.01)

(52) U.S. Cl.
CPC ........... *G02B 2027/0116* (2013.01); *G02B 2027/0178* (2013.01); *G09G 2340/0407* (2013.01)

(56) References Cited

U.S. PATENT DOCUMENTS

| | | |
|---|---|---|
| 2005/0134805 A1 | 6/2005 | Conner et al. |
| 2006/0170712 A1 | 8/2006 | Miller et al. |
| 2007/0057960 A1 | 3/2007 | Itoh et al. |
| 2007/0273626 A1 | 11/2007 | Kerofsky et al. |
| 2008/0024683 A1 | 1/2008 | Damera et al. |
| 2008/0088800 A1 | 4/2008 | Bellis et al. |
| 2009/0051712 A1 | 2/2009 | Arai et al. |
| 2009/0174638 A1 | 7/2009 | Brown et al. |
| 2009/0309895 A1 | 12/2009 | Nagase et al. |
| 2009/0322738 A1 | 12/2009 | Cable |
| 2010/0103205 A1 | 4/2010 | Iisaka et al. |
| 2010/0164978 A1* | 7/2010 | Brown Elliott ... G02F 1/133514 345/600 |
| 2010/0309347 A1 | 12/2010 | Adams et al. |
| 2011/0141131 A1* | 6/2011 | Brown Elliott ....... G06T 3/4015 345/589 |
| 2012/0287148 A1 | 11/2012 | Brown |
| 2014/0132999 A1* | 5/2014 | Pyun .................... G03H 1/0402 359/10 |
| 2014/0240378 A1 | 8/2014 | Fujioka |
| 2016/0094818 A1 | 3/2016 | Okamoto |
| 2017/0168211 A1* | 6/2017 | Donahue .............. G02B 6/0018 |
| 2018/0146183 A1* | 5/2018 | Zhou .................... H04N 13/344 |
| 2019/0004325 A1* | 1/2019 | Connor .................. G02B 30/35 |
| 2019/0235351 A1* | 8/2019 | Lee ....................... H05K 1/0203 |
| 2019/0377185 A1 | 12/2019 | Cheng |

OTHER PUBLICATIONS

United States Office Action, U.S. Appl. No. 16/379,519, dated Apr. 14, 2020, 12 pages.

* cited by examiner

RESOLUTION REDUCTION OF COLOR CHANNELS OF DISPLAY DEVICES

BACKGROUND

This disclosure relates to structure and operation of a display device and more specifically to image processing of a display device having the spatial resolution reduced in one or more color channels.

A virtual reality (VR) or augmented-reality (AR) system often includes a head-mounted display or a near-eye display for users to immerse in the simulated environment. The image quality generated by the display device directly affects the users' perception of the simulated reality and the enjoyment of the VR or AR system. Since the display device is often head mounted or portable, the display device is subject to different types of limitations such as size, distance, and power. The limitations may affect the precisions of the display in rendering images, which may result in various visual artifacts, thus negatively impacting the user experience with the VR or AR system.

SUMMARY

Embodiments described herein generally relate to a display device architecture that may include one or more light emitter arrays that have a reduced spatial resolution compared to other light emitter arrays and relate to an image processing technique that may reduce any perceived visual effect of the image formed from such architecture with a reduced resolution in one or more color channels. The image processing technique may include an anti-aliasing filter that reduces the perceived differences in spatial frequencies between the actual image generated by the display device having a reduced resolution in one or more of the color channels and the desired image specified by an input color dataset that is associated with a full resolution.

In one embodiment, a display device includes a first light emitter array and a second light emitter array. The first light emitter array may include a plurality of first light emitters. Each of the first light emitters may have a first size and emit light of a first color. The first light emitter array may have a first spatial resolution. The second light emitter array may include a plurality of second light emitters. Each of the second light emitters may have a second size that is smaller than the first size and emit light of a second color. The second light emitter array may have a second spatial resolution that is higher than the first spatial resolution. The display device may include one or more waveguides that may converge the light emitted from the plurality of first light emitters and the light emitted from the plurality of second light emitters to form an image by overlapping the light from the first light emitters and the light from the second light emitters at a spatial region. At a pixel location of the image, a portion of the light from one of the first light emitters may spatially overlap with the light from one of the second light emitters.

In one embodiment, the display device may include an image processing unit. The image processing unit may receive an input color dataset that includes at least a first input data value subset and a second input data value subset. The first input data value subset may correspond to the first array that includes the first light emitters that emit light of the first color. The second input data value subset may correspond to the second array that includes the second light emitters that emit light of the second color. The first array may have a reduced spatial resolution compared to the second array. The image processing unit may apply an anti-aliasing filter to the input color dataset. The application of the anti-aliasing filter may include convolving a first convolution kernel with the first input data value subset to generate a first convolution result. The application may also include convolving a second convolution kernel with the second input data value subset to generate a second convolution result. The application may further include combining at least the first convolution result and the second convolution result to generate a first subset of output data values. The first subset may correspond to the first light emitter array and may include output data values of one of the colors.

The figures depict embodiments of the present disclosure for purposes of illustration only.

DETAILED DESCRIPTION

Embodiments relate to display devices that include a light emitter architecture having different resolutions for different color channels and image processing unit associated with the light emitter architecture. A display device may include a plurality of monochromatic light emitter arrays. One or more of the arrays may include a reduced number of light emitters compared to other arrays so that a color channel associated with an array with the reduced number has a reduced resolution compared to other color channels. The light emitted by light emitters of different arrays may be converged by an optical component such as one or more waveguides so that the light of different colors spatially overlap at each image pixel location. The display device may include an image processing unit that applies an anti-aliasing filter that may include a plurality of convolution kernels to reduce any visual effects perceived by users with respect to one or more color channels having a reduced resolution.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
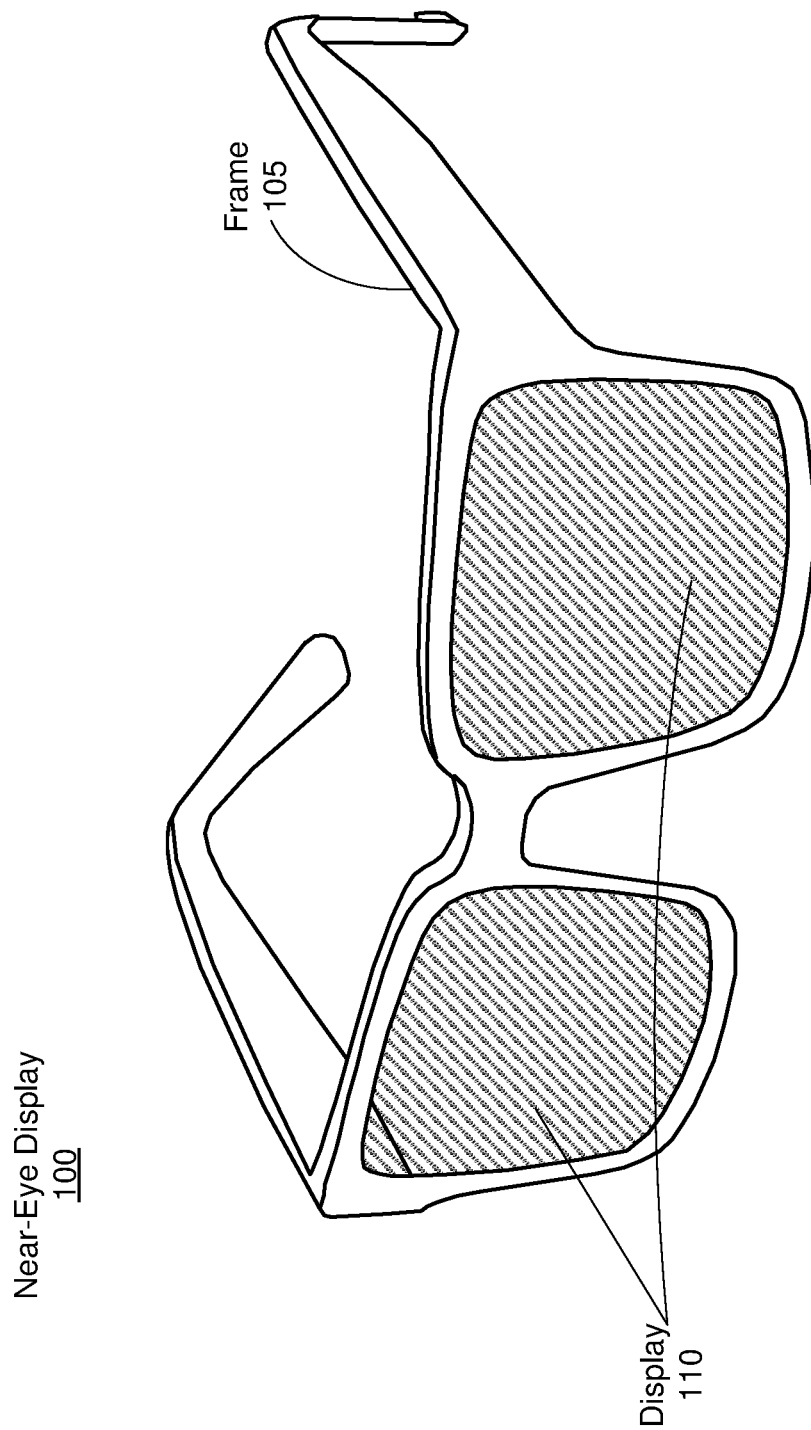
FIG. 1 is a perspective view of a near-eye-display (NED), in accordance with an embodiment.

Figure (FIG. 1 is a diagram of a near-eye display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least a source assembly to generate an image light to present media to an eye of the user. The source assembly includes, e.g., a light source, an optics system, or some combination thereof.

FIG. 1 is only an example of a VR system. However, in alternate embodiments, FIG. 1 may also be referred to as a Head-Mounted-Display (HMD).

Figure 2:
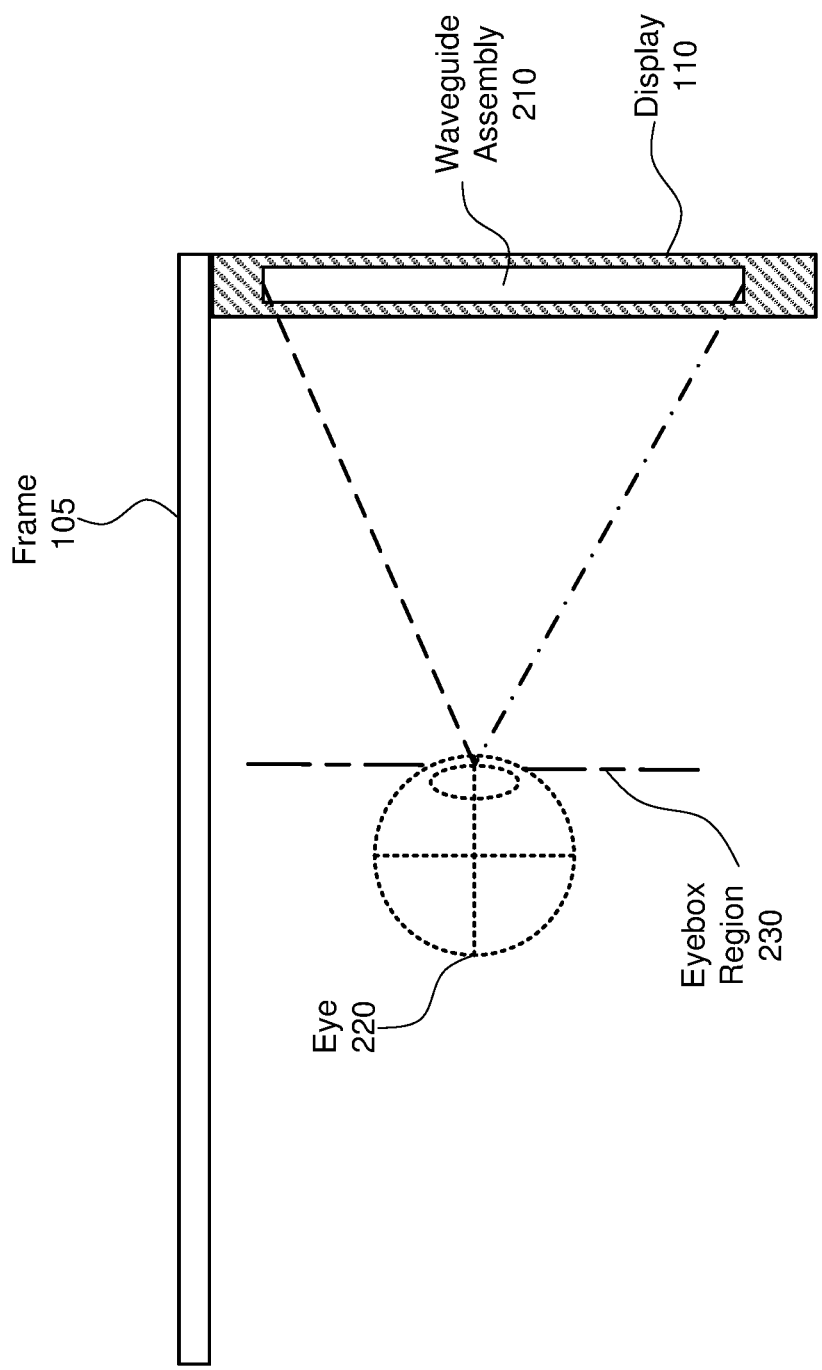
FIG. 2 is a cross-sectional view of an eyewear of the NED illustrated in FIG. 1, in accordance with an embodiment.

FIG. 2 is a cross section of the NED 100 illustrated in FIG. 1, in accordance with an embodiment. The cross section illustrates at least one waveguide assembly 210. An exit pupil is a location where the eye 220 is positioned in an eyebox region 230 when the user wears the NED 100. In some embodiments, the frame 105 may represent a frame of eye-wear glasses. For purposes of illustration, FIG. 2 shows the cross section associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, directs the image light to the eye 220 through the exit pupil. The waveguide assembly 210 may be composed of one or more materials (e.g., plastic, glass, etc.) with one or more refractive indices that effectively minimize the weight and widen a field of view (hereinafter abbreviated as 'FOV') of the NED 100. The waveguide assembly 210 may include one or more waveguides. In alternate configurations, the NED 100 includes one or more optical elements between the waveguide assembly 210 and the eye 220. The optical elements may act (e.g., correct aberrations in image light emitted from the waveguide assembly 210) to magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light. In one embodiment, the waveguide assembly 210 may produce and direct many pupil replications to the eyebox region 230, in a manner that will be discussed in further detail below in association with FIG. 5B.

Figure 3A:
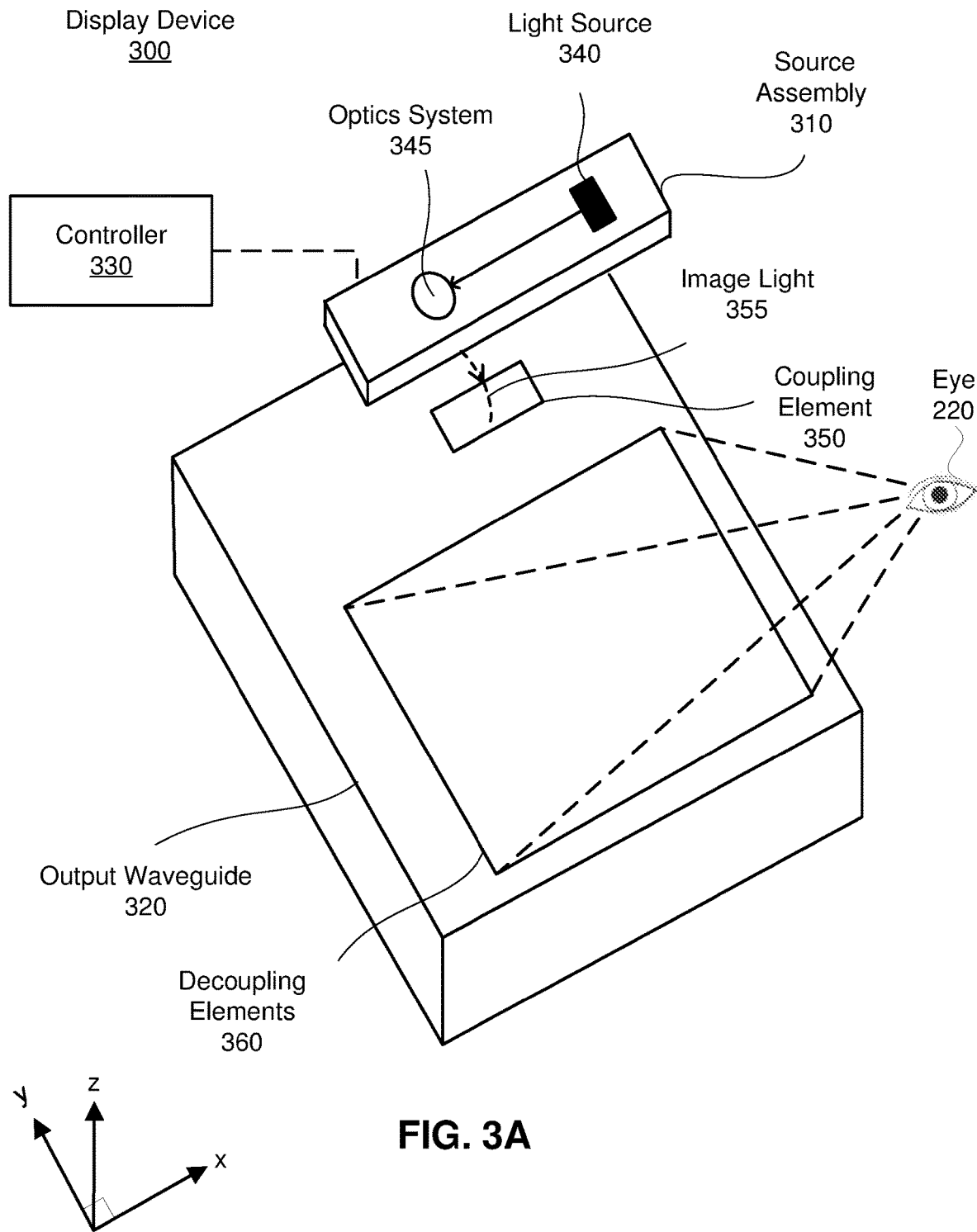
FIG. 3A is a perspective view of a display device, in accordance with an embodiment.

FIG. 3A illustrates a perspective view of a display device 300, in accordance with an embodiment. In some embodiments, the display device 300 is a component (e.g., the waveguide assembly 210 or part of the waveguide assembly 210) of the NED 100. In alternative embodiments, the display device 300 is part of some other NEDs, or another system that directs display image light to a particular location. Depending on embodiments and implementations, the display device 300 may also be referred to as a waveguide display and/or a scanning display. However, in other embodiment, the display device 300 does not include a scanning mirror. For example, the display device 300 can include matrices of light emitters that project light on an image field through a waveguide but without a scanning mirror. In another embodiment, the image emitted by the two-dimensional matrix of light emitters may be magnified by an optical assembly (e.g., lens) before the light arrives a waveguide or a screen.

For a particular embodiment that uses a waveguide and an optical system, the display device 300 may include a source assembly 310, an output waveguide 320, and a controller 330. The display device 300 may provide images for both eyes or for a single eye. For purposes of illustration, FIG. 3A shows the display device 300 associated with a single eye 220. Another display device (not shown), separated (or partially separated) from the display device 300, provides image light to another eye of the user. In a partially separated system, one or more components may be shared between display devices for each eye.

The source assembly 310 generates image light 355. The source assembly 310 includes a light source 340 and an optics system 345. The light source 340 is an optical component that generates image light using a plurality of light emitters arranged in a matrix. Each light emitter may emit monochromatic light. The light source 340 generates image light including, but not restricted to, Red image light, Blue image light, Green image light, infra-red image light, etc. While RGB is often discussed in this disclosure, embodiments described herein are not limited to using red, blue and green as primary colors. Other colors are also possible to be used as the primary colors of the display device. Also, a display device in accordance with an embodiment may use more than three primary colors.

The optics system 345 performs a set of optical processes, including, but not restricted to, focusing, combining, conditioning, and scanning processes on the image light generated by the light source 340. In some embodiments, the optics system 345 includes a combining assembly, a light conditioning assembly, and a scanning mirror assembly, as described below in detail in conjunction with FIG. 3B. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. The pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 are controlled by changing an orientation and position of the image light 355 entering the coupling element 350. The pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the image rendering operations of the source assembly 310. The controller 330 determines instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters, or some combination thereof. The controller 330 includes a combination of hardware, software, and/or firmware not shown here so as not to obscure other aspects of the disclosure.

Figure 3B:
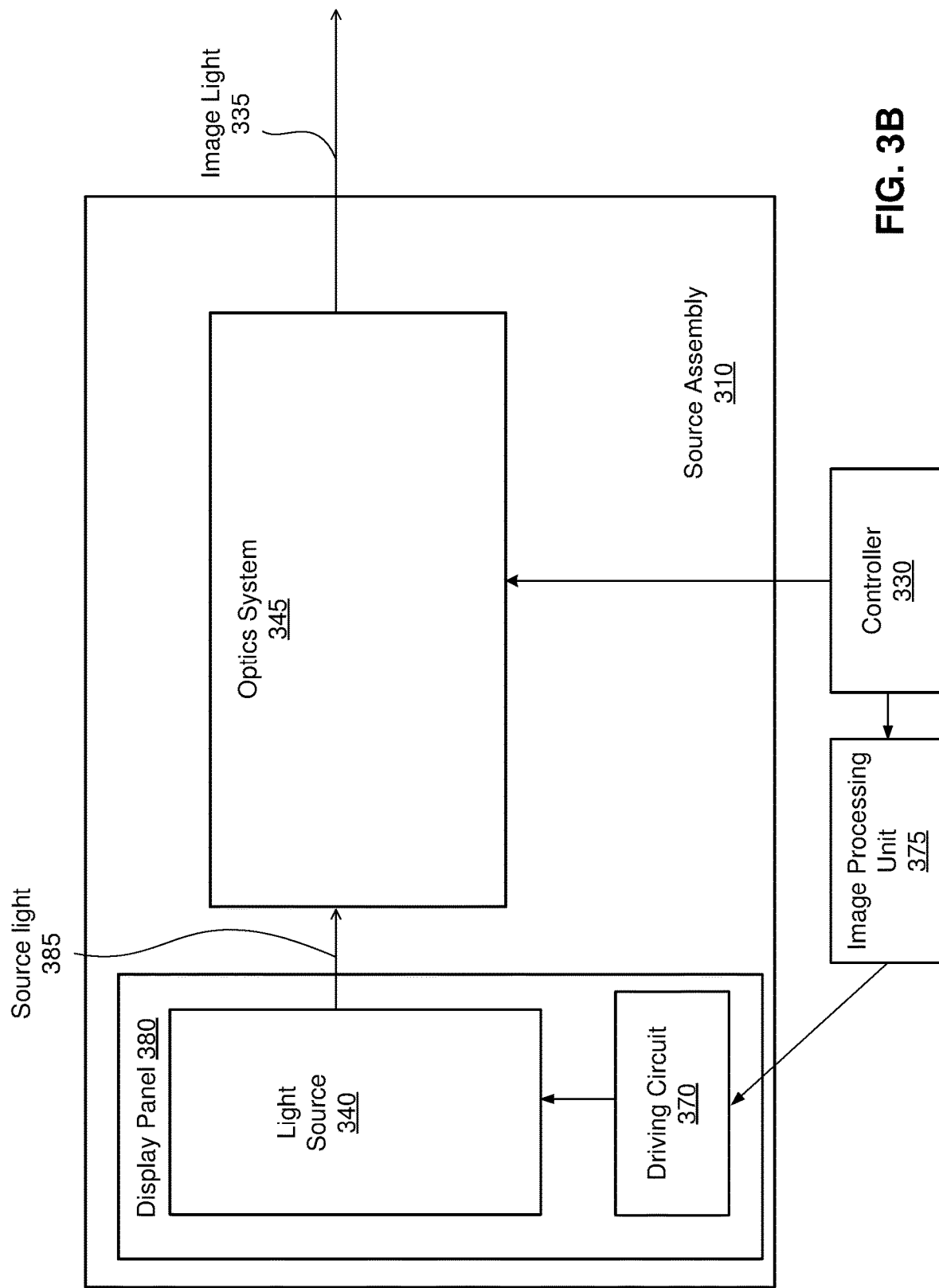
FIG. 3B is a block diagram of a display device, in accordance with an embodiment.

FIG. 3B is a block diagram illustrating an example source assembly 310, in accordance with an embodiment. The source assembly 310 includes the light source 340 that emits light that is processed optically by the optics system 345 to generate image light 335 that will be projected on an image field (not shown). The light source 340 is driven by the driving circuit 370 based on the data sent from a controller 330 or an image processing unit 375. In one embodiment, the driving circuit 370 is the circuit panel that connects to and mechanically holds various light emitters of the light source 340. The driving circuit 370 and the light source 340 combined may sometimes be referred to as a display panel 380 or an LED panel (if some forms of LEDs are used as the light emitters).

The light source 340 may generate a spatially coherent or a partially spatially coherent image light. The light source 340 may include multiple light emitters. The light emitters can be vertical cavity surface emitting laser (VCSEL) devices, light emitting diodes (LEDs), microLEDs, tunable lasers, and/or some other light-emitting devices. In one embodiment, the light source 340 includes a matrix of light emitters. In another embodiment, the light source 340 includes multiple sets of light emitters with each set grouped by color and arranged in a matrix form. The light source 340 emits light in a visible band (e.g., from about 390 nm to 700 nm). The light source 340 emits light in accordance with one or more illumination parameters that are set by the controller 330 and potentially adjusted by image processing unit 375 and driving circuit 370. An illumination parameter is an instruction used by the light source 340 to generate light. An illumination parameter may include, e.g., source wavelength, pulse rate, pulse amplitude, beam type (continuous or pulsed), other parameter(s) that affect the emitted light, or some combination thereof. The light source 340 emits source light 385. In some embodiments, the source light 385 includes multiple beams of red light, green light, and blue light, or some combination thereof.

The optics system 345 may include one or more optical components that optically adjust and potentially re-direct the light from the light source 340. One form of example adjustment of light may include conditioning the light. Conditioning the light from the light source 340 may include, e.g., expanding, collimating, correcting for one or more optical errors (e.g., field curvature, chromatic aberration, etc.), some other adjustment of the light, or some combination thereof. The optical components of the optics system 345 may include, e.g., lenses, mirrors, apertures, gratings, or some combination thereof. Light emitted from the optics system 345 is referred to as an image light 355.

The optics system 345 may redirect image light via its one or more reflective and/or refractive portions so that the image light 355 is projected at a particular orientation toward the output waveguide 320 (shown in FIG. 3A). Where the image light is redirected toward is based on specific orientations of the one or more reflective and/or refractive portions. In some embodiments, the optics system 345 includes a single scanning mirror that scans in at least two dimensions. In other embodiments, the optics system 345 may include a plurality of scanning mirrors that each scan in orthogonal directions to each other. The optics system 345 may perform a raster scan (horizontally, or vertically), a biresonant scan, or some combination thereof. In some embodiments, the optics system 345 may perform a controlled vibration along the horizontal and/or vertical directions with a specific frequency of oscillation to scan along two dimensions and generate a two-dimensional projected line image of the media presented to user's eyes. In other embodiments, the optics system 345 may also include a lens that serves similar or same function as one or more scanning mirror.

In some embodiments, the optics system 345 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 355. The image light 355 from the galvanometer mirror represents a two-dimensional line image of the media presented to the user's eyes.

In some embodiments, the source assembly 310 does not include an optics system. The light emitted by the light source 340 is projected directly to the waveguide 320 (shown in FIG. 3A).

The controller 330 controls the operations of the light source 340 and, in some cases, the optics system 345. In some embodiments, the controller 330 may be the graphics processing unit (GPU) of a display device. In other embodiments, the controller 330 may be other kinds of processors. The operations performed by the controller 330 includes taking content for display, and dividing the content into discrete sections. The controller 330 instructs the light source 340 to sequentially present the discrete sections using light emitters corresponding to a respective row in an image ultimately displayed to the user. The controller 330 instructs the optics system 345 to perform different adjustment of the light. For example, the controller 330 controls the optics system 345 to scan the presented discrete sections to different areas of a coupling element of the output waveguide 320 (shown in FIG. 3A). Accordingly, at the exit pupil of the output waveguide 320, each discrete portion is presented in a different location. While each discrete section is presented at different times, the presentation and scanning of the discrete sections occur fast enough such that a user's eye integrates the different sections into a single image or series of images. The controller 330 may also provide scanning instructions to the light source 340 that include an address corresponding to an individual source element of the light source 340 and/or an electrical bias applied to the individual source element.

The image processing unit 375 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, the image processing unit 375 may be one or more circuits that are dedicated to performing certain features. While in FIG. 3B the image processing unit 375 is shown as a stand-alone unit that is separate from the controller 330 and the driving circuit 370, in other embodiments the image processing unit 375 may be a sub-unit of the controller 330 or the driving circuit 370. In other words, in those embodiments, the controller 330 or the driving circuit 370 performs various image processing procedures of the image processing unit 375. The image processing unit 375 may also be referred to as an image processing circuit.

Light Emitters

FIGS. 4A through 4E are conceptual diagrams that illustrate different light emitters' structure and arrangement, in accordance with various embodiments.

Figure 4A:
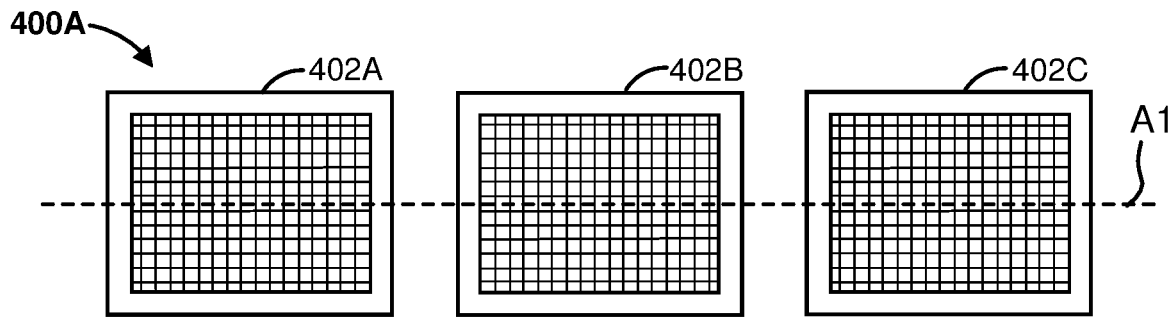
FIGS. 4A, 4B, and 4C are conceptual diagrams representing different arrangements of light emitters, in accordance with some embodiments.
Figure 4B:
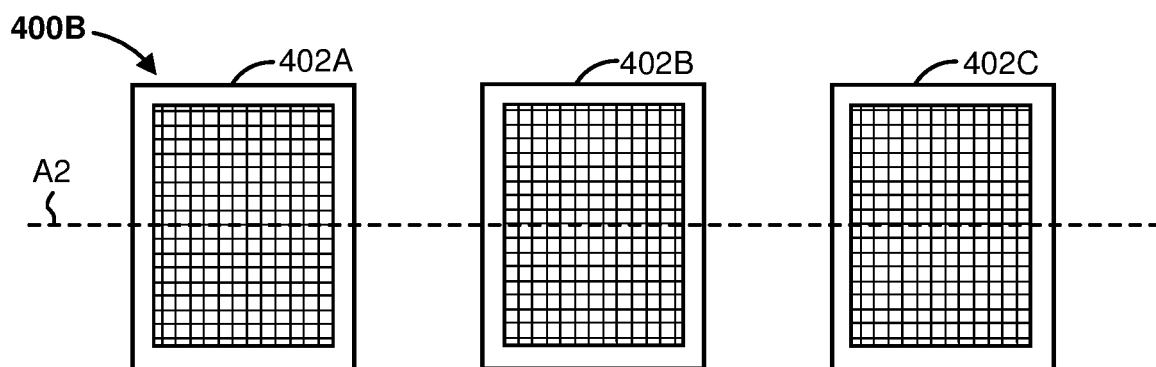
Figure 4C:
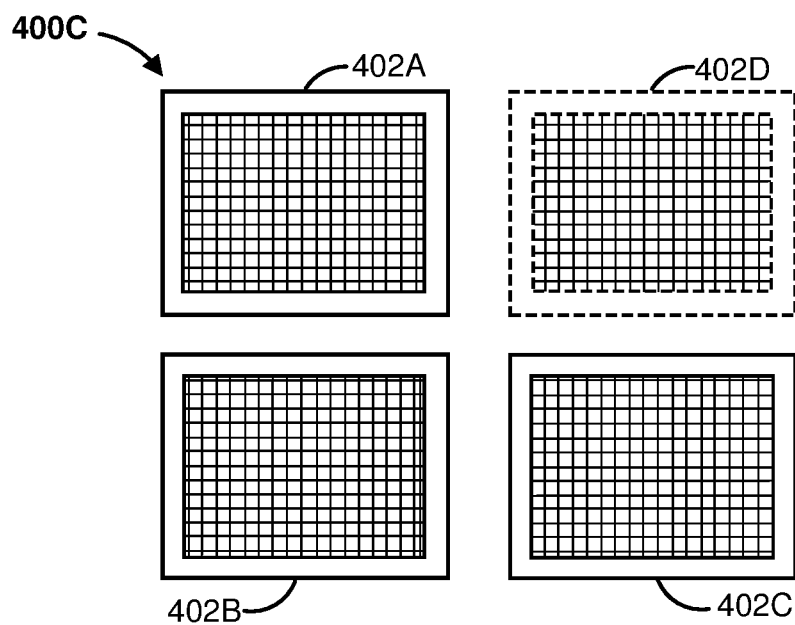

FIGS. 4A, 4B, and 4C are top views of matrix arrangement of light emitters' that may be included in the light source 340 of FIGS. 3A and 3B, in accordance to some embodiments. The configuration 400A shown in FIG. 4A is a linear configuration of the light emitter arrays 402A-C of FIG. 4A along the axis A1. This particular linear configuration may be arranged according to a longer side of the rectangular light emitter arrays 402. While the light emitter arrays 402 may have a square configuration of light emitters in some embodiments, other embodiments may include a rectangular configuration of light emitters. The light emitter arrays 402A-C each includes multiple rows and columns of light emitters. Each light emitter array 402A-C may include light emitters of a single color. For example, light emitter array 402A may include red light emitters, light emitter array 402B may include green light emitters, and light emitter array 402C may include blue light emitters. In other embodiments, the light emitter arrays 402A-C may have other configurations (e.g., oval, circular, or otherwise rounded in some fashion) while defining a first dimension (e.g., a width) and a second dimension (e.g., length) orthogonal to the first direction, with one dimension being either equal or unequal to each other. In FIG. 4B, the light emitter arrays 402A-C may be disposed in a linear configuration 400B according to a shorter side of the rectangular light emitter arrays 402, along an axis A2. FIG. 4C shows a triangular configuration of the light emitter arrays 402A-C in which the centers of the light emitter arrays 402 form a non-linear (e.g., triangular) shape or configuration. Some embodiments of the configuration 400C of FIG. 4C may further include a white-light emitter array 402D, such that the light emitter arrays 402 are in a rectangular or square configuration. The light emitter arrays 402 may have a two-dimensional light emitter configuration with more than 1000 by 1000 light emitters, in some embodiments. Various other configurations are also within the scope of the present disclosure.

While the matrix arrangements of light emitters shown in FIGS. 4A-4C are arranged in perpendicular rows and columns, in other embodiments the matrix arrangements may be arranged other forms. For example, some of the light emitters may be aligned diagonally or in other arrangements, regular or irregular, symmetrical or asymmetrical. Also, the terms rows and columns may describe two relative spatial relationships of elements. While, for the purpose of simplicity, a column described herein is normally associated with a vertical line of elements, it should be understood that a column does not have to be arranged vertically (or longitudinally). Likewise, a row does not have to be arranged horizontally (or laterally). A row and a column may also sometimes describe an arrangement that is non-linear. Rows and columns also do not necessarily imply any parallel or perpendicular arrangement. Sometimes a row or a column may be referred to as a line. Also, in some embodiments, the light emitters may not be arranged in a matrix configuration. For example, in some display devices that include a rotating mirror that will be discussed in further details in FIG. 5A, there may be a single line of light emitters for each color. In other embodiments, there may be two or three lines of light emitters for each color.

Figure 4D:
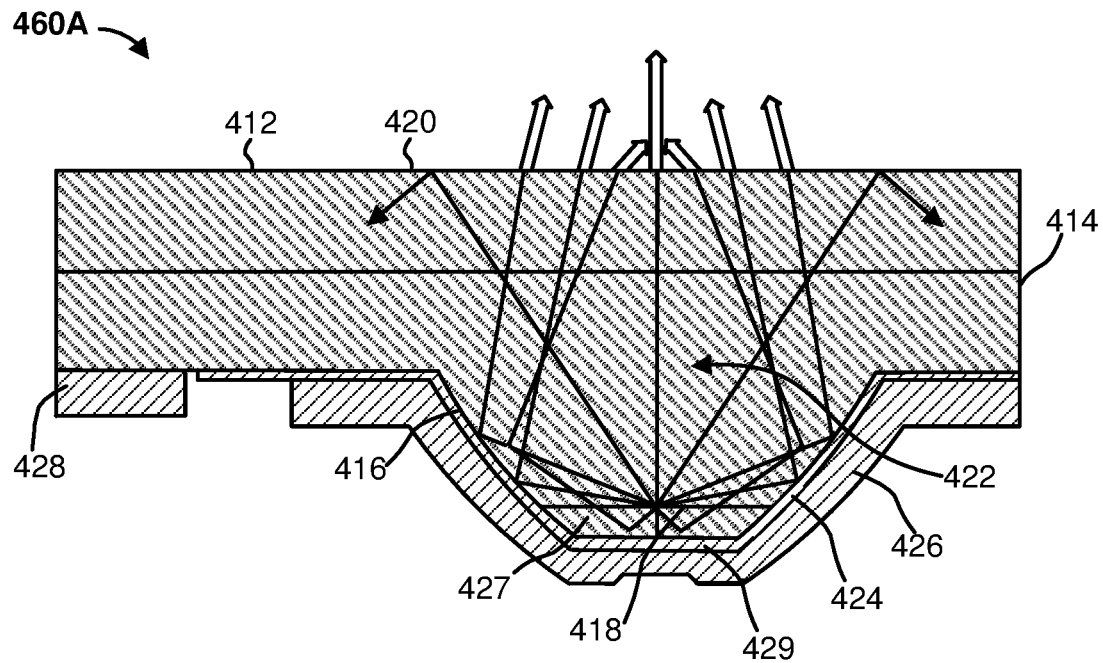
FIGS. 4D and 4E are schematic cross-sectional diagrams of light emitters, in accordance with some embodiments
Figure 4E:
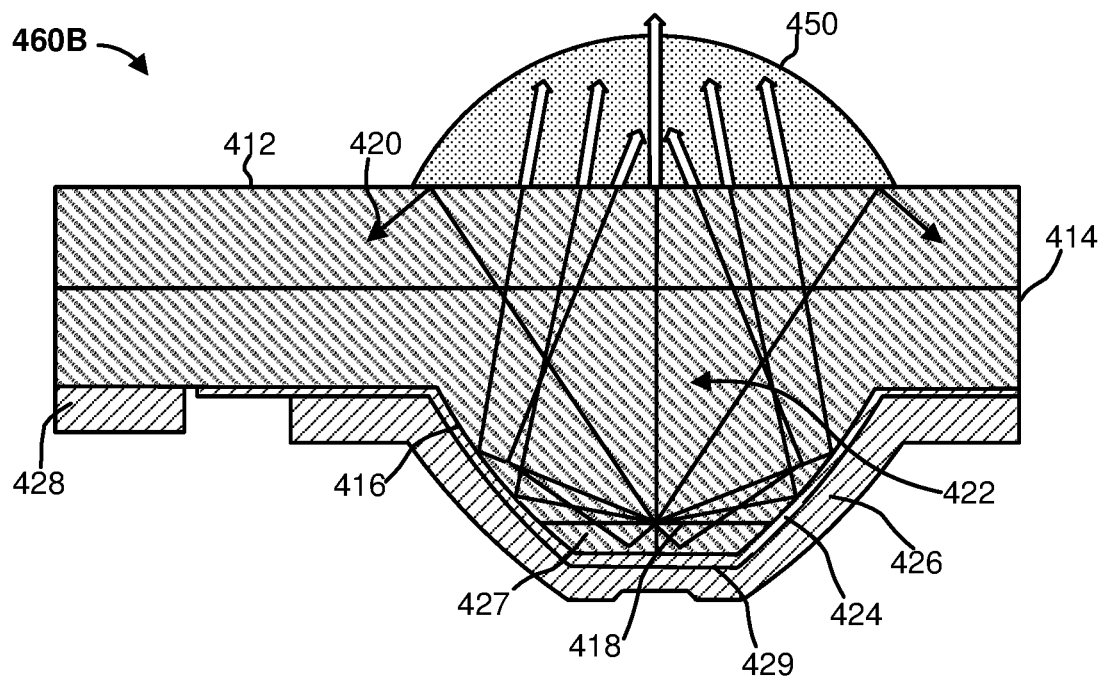

FIGS. 4D and 4E are schematic cross-sectional diagrams of an example of light emitters 410 that may be used as an individual light emitter in the light emitter arrays 402 of FIGS. 4A-C, in accordance with some embodiments. In one embodiment, the light emitter 410 may be microLED 410A. In other embodiments, other types of light emitters may be used. FIG. 4D shows a schematic cross-section of a microLED 410A. A "microLED" may be a particular type of LED having a small active light emitting area (e.g., less than 2,000 $\mu m^2$ in some embodiments, less than 20 $\mu m^2$ or less than 10 $\mu m^2$ in other embodiments). In some embodiments, the emissive surface of the microLED 410A may have a diameter of less than approximately 5 μm, although smaller (e.g., 2 μm) or larger diameters for the emissive surface may be utilized in other embodiments. The microLED 410A may also have collimated or non-Lambertian light output, in some examples, which may increase the brightness level of light emitted from a small active light-emitting area.

The microLED 410A may include, among other components, an LED substrate 412 with a semiconductor epitaxial layer 414 disposed on the substrate 412, a dielectric layer 424 and a p-contact 429 disposed on the epitaxial layer 414, a metal reflector layer 426 disposed on the dielectric layer 424 and p-contact 429, and an n-contact 428 disposed on the epitaxial layer 414. The epitaxial layer 414 may be shaped into a mesa 416. An active light-emitting area 418 may be formed in the structure of the mesa 416 by way of a p-doped region 427 of the epitaxial layer 414.

The substrate 412 may include transparent materials such as sapphire or glass. In one embodiment, the substrate 412 may include silicon, silicon oxide, silicon dioxide, aluminum oxide, sapphire, an alloy of silicon and germanium, indium phosphide (InP), and the like. In some embodiments, the substrate 412 may include a semiconductor material (e.g., monocrystalline silicon, germanium, silicon germanium (SiGe), and/or a III-V based material (e.g., gallium arsenide), or any combination thereof. In various embodiments, the substrate 412 can include a polymer-based substrate, glass, or any other bendable substrate including two-dimensional materials (e.g., graphene and molybdenum disulfide), organic materials (e.g., pentacene), transparent oxides (e.g., indium gallium zinc oxide (IGZO)), polycrystalline III-V materials, polycrystalline germanium, polycrystalline silicon, amorphous III-V materials, amorphous germanium, amorphous silicon, or any combination thereof. In some embodiments, the substrate 412 may include a III-V compound semiconductor of the same type as the active LED (e.g., gallium nitride). In other examples, the substrate 412 may include a material having a lattice constant close to that of the epitaxial layer 414.

The epitaxial layer 414 may include gallium nitride (GaN) or gallium arsenide (GaAs). The active layer 418 may include indium gallium nitride (InGaN). The type and structure of semiconductor material used may vary to produce microLEDs that emit specific colors. In one embodiment, the semiconductor materials used can include a III-V semiconductor material. III-V semiconductor material layers can include those materials that are formed by combining group III elements (Al, Ga, In, etc.) with group V elements (N, P, As, Sb, etc.). The p-contact 429 and n-contact 428 may be contact layers formed from indium tin oxide (ITO) or another conductive material that can be transparent at the desired thickness or arrayed in a grid-like pattern to provide for both good optical transmission/transparency and electrical contact, which may result in the microLED 410A also being transparent or substantially transparent. In such examples, the metal reflector layer 426 may be omitted. In other embodiments, the p-contact 429 and the n-contact 428 may include contact layers formed from conductive material (e.g., metals) that may not be optically transmissive or transparent, depending on pixel design.

In some implementations, alternatives to ITO can be used, including wider-spectrum transparent conductive oxides (TCOs), conductive polymers, metal grids, carbon nanotubes (CNT), graphene, nanowire meshes, and thin-metal films. Additional TCOs can include doped binary compounds, such as aluminum-doped zinc-oxide (AZO) and indium-doped cadmium-oxide. Additional TCOs may include barium stannate and metal oxides, such as strontium vanadate and calcium vanadate. In some implementations, conductive polymers can be used. For example, a poly(3,4-ethylenedioxythiophene) PEDOT: poly(styrene sulfonate) PSS layer can be used. In another example, a poly(4,4-dioctyl cyclopentadithiophene) material doped with iodine or 2,3-dichloro-5,6-dicyano-1,4-benzoquinone (DDQ) can be used. The example polymers and similar materials can be spin-coated in some example embodiments.

In some embodiments, the p-contact 429 may be of a material that forms an ohmic contact with the p-doped region 427 of the mesa 416. Examiner of such materials may include, but are not limited to, palladium, nickel oxide deposited as a NiAu multilayer coating with subsequent oxidation and annealing, silver, nickel oxide/silver, gold/zinc, platinum gold, or other combinations that form ohmic contacts with p-doped III-V semiconductor material.

The mesa 416 of the epitaxial layer 414 may have a truncated top on a side opposed to a substrate light emissive surface 420 of the substrate 412. The mesa 416 may also have a parabolic or near-parabolic shape to form a reflective enclosure or parabolic reflector for light generated within the microLED 410A. However, while FIG. 4D depicts a parabolic or near-parabolic shape for the mesa 416, other shapes for the mesa 416 are possible in other embodiments. The arrows indicate how light 422 emitted from the active layer 418 may be reflected off the internal walls of the mesa 416 toward the light emissive surface 420 at an angle sufficient for the light to escape the microLED 410A (i.e., outside an angle of total internal reflection). The p-contact 429 and the n-contact 428 may electrically connect the microLED 410A to a substrate.

The parabolic-shaped structure of the microLED 410A may result in an increase in the extraction efficiency of the microLED 410A into low illumination angles when compared to unshaped or standard LEDs. Standard LED dies may generally provide an emission full width at half maximum (FWHM) angle of 120°. In comparison, the microLED 410A can be designed to provide controlled emission angle FWHM of less than standard LED dies, such as around 41°. This increased efficiency and collimated output of the microLED 410A can enable improvement in overall power efficiency of the NED, which can be important for thermal management and/or battery life.

The microLED 410A may include a circular cross-section when cut along a horizontal plane, as shown in FIG. 4D. However, the microLED 410A cross-section may be non-circular in other examples. The microLED 410A may have a parabolic structure etched directly onto the LED die during the wafer processing steps. The parabolic structure may include the active light-emitting area 418 of the microLED 410A to generate light, and the parabolic structure may reflect a portion of the generated light to form the quasi-collimated light 422 emitted from the substrate light emissive surface 420. In some examples, the optical size of the microLED 410A may be smaller than or equal to the active light-emitting area 418. In other embodiments, the optical size of the microLED 410A may be larger than the active light-emitting area 418, such as through a refractive or reflective approach, to improve usable brightness of the microLED 410A, including any chief ray angle (CRA) offsets to be produced by the light emitter array 402.

FIG. 4E depicts a microLED 410B that is similar in many respects to the microLED 410A of FIG. 4D. The microLED 410B may further include a microlens 450, which may be formed over the parabolic structure. In some embodiments, the microlens 450 may be formed by applying a polymer coating over the microLED 410A, patterning the coating, and reflowing the coating to achieve the desired lens curvature. The microlens 450 may be disposed over an emissive surface to alter a chief ray angle of the microLED 410B. In another embodiment, the microlens 450 may be formed by depositing a microlens material above the microLED 410A (for example, by a spin-on method or a deposition process). For example, a microlens template (not shown) having a curved upper surface can be patterned above the microlens material. In some embodiments, the microlens template may include a photoresist material exposed using a distributing exposing light dose (e.g., for a negative photoresist, more light is exposed at a bottom of the curvature and less light is exposed at a top of the curvature), developed, and baked to form a rounding shape. The microlens 450 can then be formed by selectively etching the microlens material according to the microlens template. In some embodiments, the shape of the microlens 450 may be formed by etching into the substrate 412. In other embodiments, other types of light-shaping or light-distributing elements, such as an annular lens, Fresnel lens, or photonic crystal structures, may be used instead of microlenses.

In some embodiments, microLED arrangements other than those specifically discussed above in conjunction with FIGS. 4D and 4E may be employed as a microLED in light emitter array 402. For example, the microLED may include isolated pillars of epitaxially grown light-emitting material surrounded by a metal reflector. The pixels of the light emitter array 402 may also include clusters of small pillars (e.g., nanowires) of epitaxially grown material that may or may not be surrounded by reflecting material or absorbing material to prevent optical crosstalk. In some examples, the microLED pixels may be individual metal p-contacts on a planar, epitaxially grown LED device, in which the individual pixels may be electrically isolated using passivation means, such as plasma treatment, ion-implantation, or the like. Such devices may be fabricated with light extraction enhancement methods, such as microlenses, diffractive structures, or photonic crystals. Other processes for fabricating the microLEDs of the dimensions noted above other than those specifically disclosed herein may be employed in other embodiments.

Formation of an Image

Figure 5A:
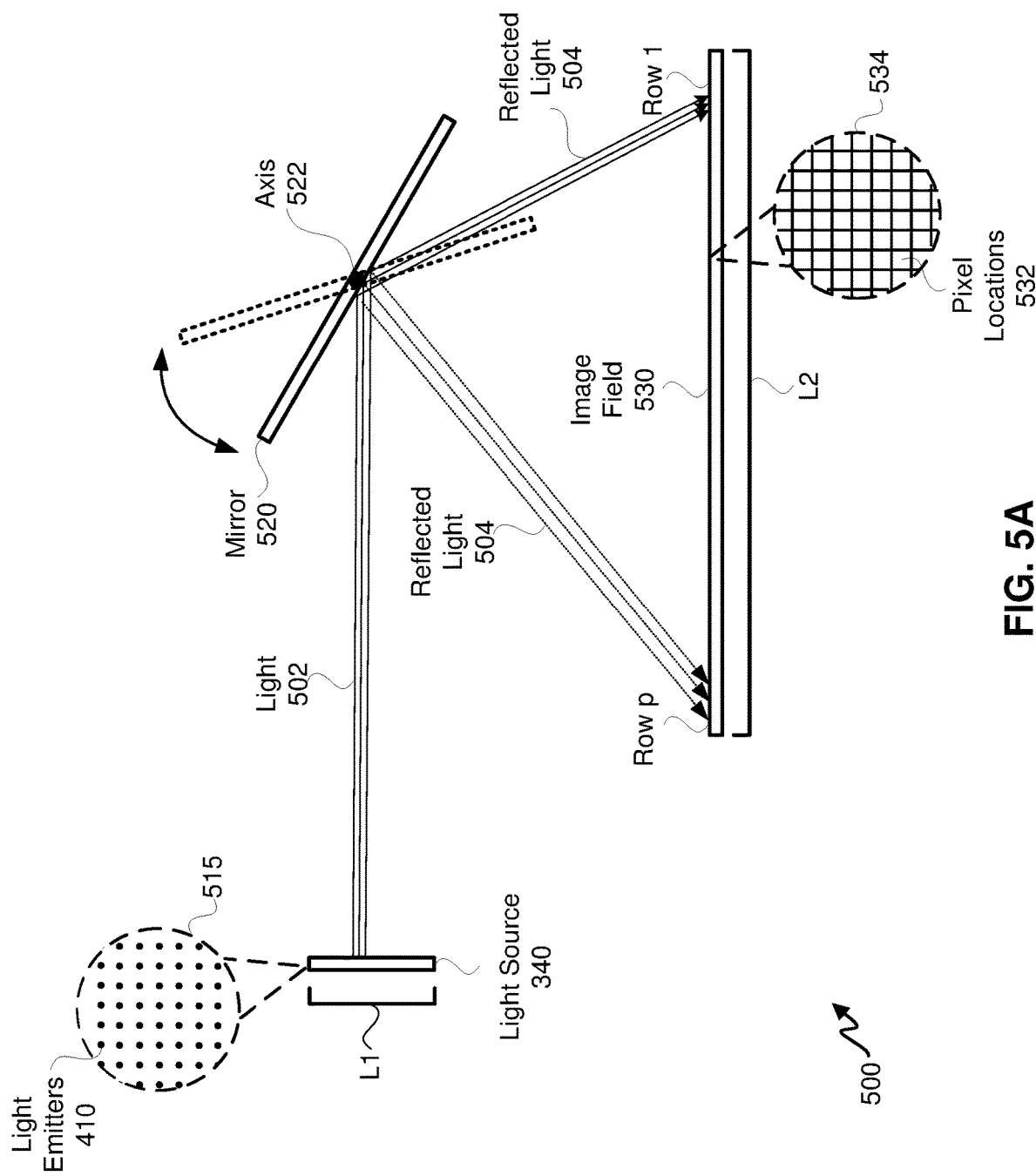
FIG. 5A is a diagram illustrating a scanning operation of a display device using a mirror to project light from a light source to an image field, in accordance with an embodiment.
Figure 5B:
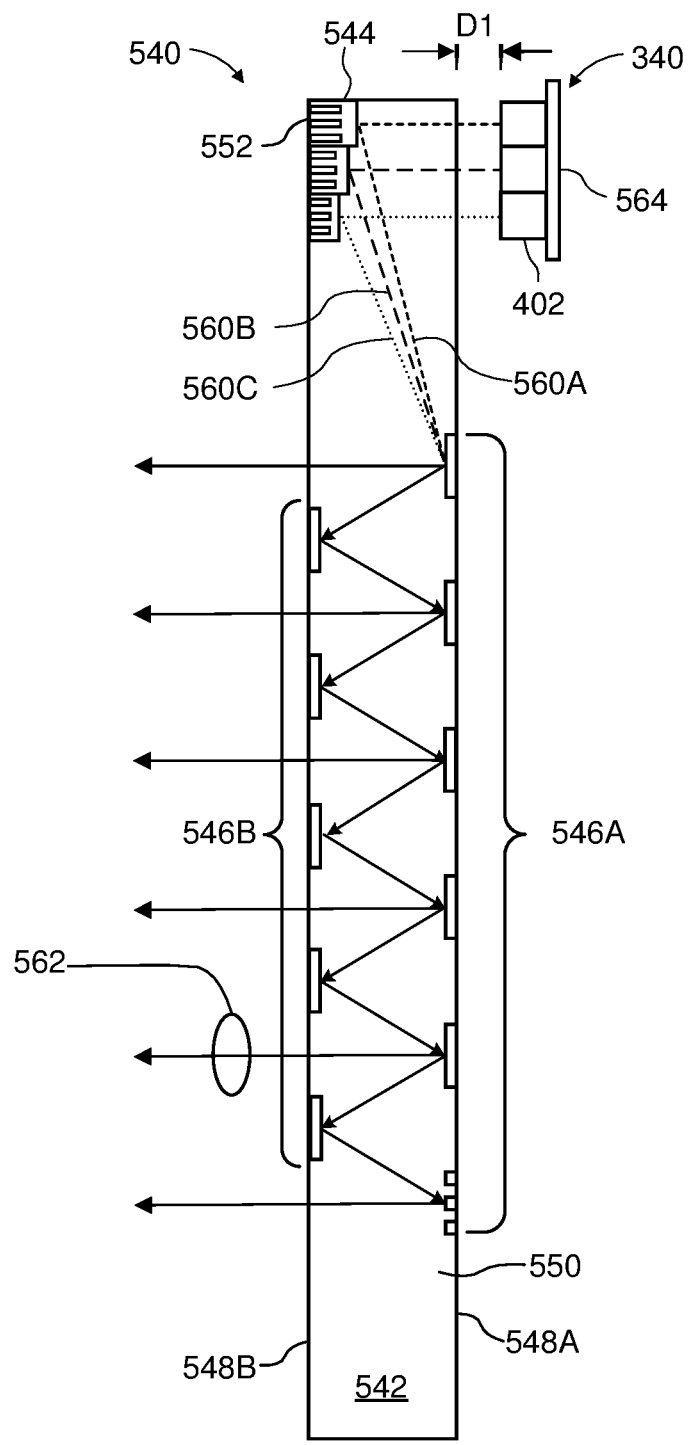
FIG. 5B is a diagram illustrating a waveguide configuration, in accordance with an embodiment.

FIGS. 5A and 5B illustrate how images and pupil replications are formed in a display device based on different structural arrangement of light emitters, in accordance with different embodiments. An image field is an area that receives the light emitted by the light source and forms an image. For example, an image field may correspond to a portion of the coupling element 350 or a portion of the decoupling element 360 in FIG. 3A. In some cases, an image field is not an actual physical structure but is an area to which the image light is projected and which the image is formed. In one embodiment, the image field is a surface of the coupling element 350 and the image formed on the image field is magnified as light travels through the output waveguide 320. In another embodiment, an image field is formed after light passing through the waveguide which combines the light of different colors to form the image field. In some embodiments, the image field may be projected directly into the user's eyes.

FIG. 5A is a diagram illustrating a scanning operation of a display device 500 using a scanning mirror 520 to project light from a light source 340 to an image field 530, in accordance with an embodiment. The display device 500 may correspond to the near-eye display 100 or another scan-type display device. The light source 340 may correspond to the light source 340 shown in FIG. 3B, or may be used in other display devices. The light source 340 includes multiple rows and columns of light emitters 410, as represented by the dots in inset 515. In one embodiment, the light source 340 may include a single line of light emitters 410 for each color. In other embodiments, the light source 340 may include more than one lines of light emitters 410 for each color. The light 502 emitted by the light source 340 may be a set of collimated beams of light. For example, the light 502 in FIG. 5 shows multiple beams that are emitted by a column of light emitters 410. Before reaching the mirror 520, the light 502 may be conditioned by different optical devices such as the conditioning assembly 430 (shown in FIG. 3B but not shown in FIG. 5). The mirror 520 reflects and projects the light 502 from the light source 340 to the image field 530. The mirror 520 rotates about an axis 522. The mirror 520 may be a microelectromechanical system (MEMS) mirror or any other suitable mirror. The mirror 520 may be an embodiment of the optics system 345 in FIG. 3B or a part of the optics system 345. As the mirror 520 rotates, the light 502 is directed to a different part of the image field 530, as illustrated by the reflected part of the light 504 in solid lines and the reflected part of the light 504 in dash lines.

At a particular orientation of the mirror 520 (i.e., a particular rotational angle), the light emitters 410 illuminate a portion of the image field 530 (e.g., a particular subset of multiple pixel locations 532 on the image field 530). In one embodiment, the light emitters 410 are arranged and spaced such that a light beam from each light emitter 410 is projected on a corresponding pixel location 532. In another embodiment, small light emitters such as microLEDs are used for light emitters 410 so that light beams from a subset of multiple light emitters are together projected at the same pixel location 532. In other words, a subset of multiple light emitters 410 collectively illuminates a single pixel location 532 at a time.

The image field 530 may also be referred to as a scan field because, when the light 502 is projected to an area of the image field 530, the area of the image field 530 is being illuminated by the light 502. The image field 530 may be spatially defined by a matrix of pixel locations 532 (represented by the blocks in inset 534) in rows and columns. A pixel location here refers to a single pixel. The pixel locations 532 (or simply the pixels) in the image field 530 sometimes may not actually be additional physical structure. Instead, the pixel locations 532 may be spatial regions that divide the image field 530. Also, the sizes and locations of the pixel locations 532 may depend on the projection of the light 502 from the light source 340. For example, at a given angle of rotation of the mirror 520, light beams emitted from the light source 340 may fall on an area of the image field 530. As such, the sizes and locations of pixel locations 532 of the image field 530 may be defined based on the location of each light beam. In some cases, a pixel location 532 may be subdivided spatially into subpixels (not shown). For example, a pixel location 532 may include a Red subpixel, a Green subpixel, and a Blue subpixel. The Red subpixel corresponds to a location at which one or more Red light beams are projected, etc. When subpixels are present, the color of a pixel 532 is based on the temporal and/or spatial average of the subpixels.

The number of rows and columns of light emitters 410 of the light source 340 may or may not be the same as the number of rows and columns of the pixel locations 532 in the image field 530. In one embodiment, the number of light emitters 410 in a row is equal to the number of pixel locations 532 in a row of the image field 530 while the number of light emitters 410 in a column is two or more but fewer than the number of pixel locations 532 in a column of the image field 530. Put differently, in such embodiment, the light source 340 has the same number of columns of light emitters 410 as the number of columns of pixel locations 532 in the image field 530 but has fewer rows than the image field 530. For example, in one specific embodiment, the light source 340 has about 1280 columns of light emitters 410, which is the same as the number of columns of pixel locations 532 of the image field 530, but only a handful of light emitters 410. The light source 340 may have a first length L1, which is measured from the first row to the last row of light emitters 410. The image field 530 has a second length L2, which is measured from row 1 to row p of the scan field 530. In one embodiment, L2 is greater than L1 (e.g., L2 is 50 to 10,000 times greater than L1).

Since the number of rows of pixel locations 532 is larger than the number of rows of light emitters 410 in some embodiments, the display device 500 uses the mirror 520 to project the light 502 to different rows of pixels at different times. As the mirror 520 rotates and the light 502 scans through the image field 530 quickly, an image is formed on the image field 530. In some embodiments, the light source 340 also has a smaller number of columns than the image field 530. The mirror 520 can rotate in two dimensions to fill the image field 530 with light (e.g., a raster-type scanning down rows then moving to new columns in the image field 530).

The display device may operate in predefined display periods. A display period may correspond to a duration of time in which an image is formed. For example, a display period may be associated with the frame rate (e.g., a reciprocal of the frame rate). In the particular embodiment of display device 500 that includes a rotating mirror, the display period may also be referred to as a scanning period. A complete cycle of rotation of the mirror 520 may be referred to as a scanning period. A scanning period herein refers to a predetermined cycle time during which the entire image field 530 is completely scanned. The scanning of the image field 530 is controlled by the mirror 520. The light generation of the display device 500 may be synchronized with the rotation of the mirror 520. For example, in one embodiment, the movement of the mirror 520 from an initial position that projects light to row 1 of the image field 530, to the last position that projects light to row p of the image field 530, and then back to the initial position is equal to a scanning period. The scanning period may also be related to the frame rate of the display device 500. By completing a scanning period, an image (e.g., a frame) is formed on the image field 530 per scanning period. Hence, the frame rate may correspond to the number of scanning periods in a second.

As the mirror 520 rotates, light scans through the image field and images are formed. The actual color value and light intensity (brightness) of a given pixel location 532 may be an average of the color various light beams illuminating the pixel location during the scanning period. After completing a scanning period, the mirror 520 reverts back to the initial position to project light onto the first few rows of the image field 530 again, except that a new set of driving signals may be fed to the light emitters 410. The same process may be repeated as the mirror 520 rotates in cycles. As such, different images are formed in the scanning field 530 in different frames.

FIG. 5B is a conceptual diagram illustrating a waveguide configuration to form an image and replications of images that may be referred to as pupil replications, in accordance with an embodiment. In this embodiment, the light source of the display device may be separated into three different light emitter arrays 402, such as based on the configurations shown in FIGS. 4A and 4B. The primary colors may be red, green, and blue or another combination of other suitable primary colors. In one embodiment, the number of light emitters in each light emitter array 402 may be equal to the number of pixel locations an image field (not shown in FIG. 5B). As such, contrary to the embodiment shown in FIG. 5A that uses a scanning operation, each light emitter may be dedicated to generating images at a pixel location of the image field. In another embodiment, the configuration shown in FIGS. 5A and 5B may be combined. For example, the configuration shown in FIG. 5B may be located downstream of the configuration shown in FIG. 5A so that the image formed by the scanning operation in FIG. 5A may further be replicated to generate multiple replications.

The embodiments depicted in FIG. 5B may provide for the projection of many image replications (e.g., pupil replications) or decoupling a single image projection at a single point. Accordingly, additional embodiments of disclosed NEDs may provide for a single decoupling element. Outputting a single image toward the eyebox 230 may preserve the intensity of the coupled image light. Some embodiments that provide for decoupling at a single point may further provide for steering of the output image light. Such pupil-steering NEDs may further include systems for eye tracking to monitor a user's gaze. Some embodiments of the waveguide configurations that provide for pupil replication, as described herein, may provide for one-dimensional replication, while other embodiments may provide for two-dimensional replication. For simplicity, one-dimensional pupil replication is shown in FIG. 5B. Two-dimensional pupil replication may include directing light into and outside the plane of FIG. 5B. FIG. 5B is presented in a simplified format. The detected gaze of the user may be used to adjust the position and/or orientation of the light emitter arrays 402 individually or the light source 340 as a whole and/or to adjust the position and/or orientation of the waveguide configuration.

In FIG. 5B, a waveguide configuration 540 is disposed in cooperation with a light source 340, which may include one or more monochromatic light emitter arrays 402 secured to a support structure 564 (e.g., a printed circuit board or another structure). The support structure 564 may be coupled to the frame 105 of FIG. 1. The waveguide configuration 540 may be separated from the light source 340 by an air gap having a distance D1. The distance D1 may be in a range from approximately 50 μm to approximately 500 μm in some examples. The monochromatic image or images projected from the light source 340 may pass through the air gap toward the waveguide configuration 540. Any of the light source embodiments described herein may be utilized as the light source 340.

The waveguide configuration may include a single waveguide 542 or multiple waveguides 542, which may be formed from a glass or plastic material. The waveguide 542 may include a coupling area 544 and a decoupling area formed by decoupling elements 546A on a top surface 548A and decoupling elements 546B on a bottom surface 548B in some embodiments. The area within the waveguide 542 in between the decoupling elements 546A and 546B may be considered a propagation area 550, in which light images received from the light source 340 and coupled into the waveguide 542 by coupling elements included in the coupling area 544 may propagate laterally within the waveguide 542.

The coupling area 544 may include a coupling element 552 configured and dimensioned to couple light of a predetermined wavelength, e.g., red, green, or blue light. When a white light emitter array is included in the light source 340, the portion of the white light that falls in the predetermined wavelength may be coupled by each of the coupling elements 552. In some embodiments, the coupling elements 552 may be gratings, such as Bragg gratings, dimensioned to couple a predetermined wavelength of light. In some examples, the gratings of each coupling element 552 may exhibit a separation distance between gratings associated with the predetermined wavelength of light that the particular coupling element 552 is to couple into the waveguide 542, resulting in different grating separation distances for each coupling element 552. Accordingly, each coupling element 552 may couple a limited portion of the white light from the white light emitter array when included. In other examples, the grating separation distance may be the same for each coupling element 552. In some examples, coupling element 552 may be or include a multiplexed coupler.

As shown in FIG. 5B, a red image 560A, a blue image 560B, and a green image 560C may be coupled by the coupling elements of the coupling area 544 into the propagation area 550 and may begin traversing laterally within the waveguide 542. In one embodiment, the red image 560A, the blue image 560B, and the green image 560C, each represented by a different dash line in FIG. 5B, may converge to form an overall image that is represented by a solid line. For simplicity, FIG. 5B may show an image by a single arrow, but each arrow may represent an image field where the image is formed. In another embodiment, red image 560A, the blue image 560B, and the green image 560C, may correspond to different spatial locations. In various embodiments, one or more waveguides may be used. For example, in one embodiment, each monochromatic light emitter array 402 may project light to its respective waveguide in a larger waveguide stack that combines the three color channels. In another embodiment, two monochromatic light emitter arrays 402 may project light to a first waveguide and another monochromatic light emitter array 402 may project light to a second waveguide. The display device may include a third waveguide to converge the light of the three color channels. In other embodiments, other suitable combinations of waveguides and light projection arrangement may also be possible.

A portion of the light may be projected out of the waveguide 542 after the light contacts the decoupling element 546A for one-dimensional pupil replication, and after the light contacts both the decoupling element 546A and the decoupling element 546B for two-dimensional pupil replication. In two-dimensional pupil replication embodiments, the light may be projected out of the waveguide 542 at locations where the pattern of the decoupling element 546A intersects the pattern of the decoupling element 546B.

The portion of light that is not projected out of the waveguide 542 by the decoupling element 546A may be reflected off the decoupling element 546B. The decoupling element 546B may reflect all incident light back toward the decoupling element 546A, as depicted. Accordingly, the waveguide 542 may combine the red image 560A, the blue image 560B, and the green image 560C into a polychromatic image instance, which may be referred to as a pupil replication 562. The polychromatic pupil replication 562 may be projected toward the eyebox 230 of FIG. 2 and to the eye 220, which may interpret the pupil replication 562 as a full-color image (e.g., an image including colors in addition to red, green, and blue). The waveguide 542 may produce tens or hundreds of pupil replications 562 or may produce a single replication 562.

In some embodiments, the waveguide configuration may differ from the configuration shown in FIG. 5B. For example, the coupling area may be different. Rather than including gratings as coupling element 552, an alternate embodiment may include a prism that reflects and refracts received image light, directing it toward the decoupling element 706A. Also, while FIG. 5B generally shows the light source 340 having multiple light emitters arrays 402 coupled to the same support structure 564, other embodiments may employ a light source 340 with separate monochromatic emitters arrays 402 located at disparate locations about the waveguide configuration (e.g., one or more emitters arrays 402 located near a top surface of the waveguide configuration and one or more emitters arrays 402 located near a bottom surface of the waveguide configuration).

Also, although only three light emitter arrays are shown in FIG. 5B, an embodiment may include more or fewer light emitter arrays. For example, in one embodiment, a display device may include two red arrays, two green arrays, and two blue arrays. In one case, the extra set of emitter panels provides redundant light emitters for the same pixel location. In another case, one set of red, green, and blue panels is responsible for generating light corresponding to the most significant bits of a color dataset for a pixel location while another set of panels is responsible for generating light corresponding the least significant bits of the color dataset.

While FIGS. 5A and 5B show different ways an image may be formed in a display device, the configurations shown in FIGS. 5A and 5B are not mutually exclusive. For example, in one embodiment, a display device may use both a rotating mirror and a waveguide to form an image and also to form multiple pupil replications.

Figure 5C:
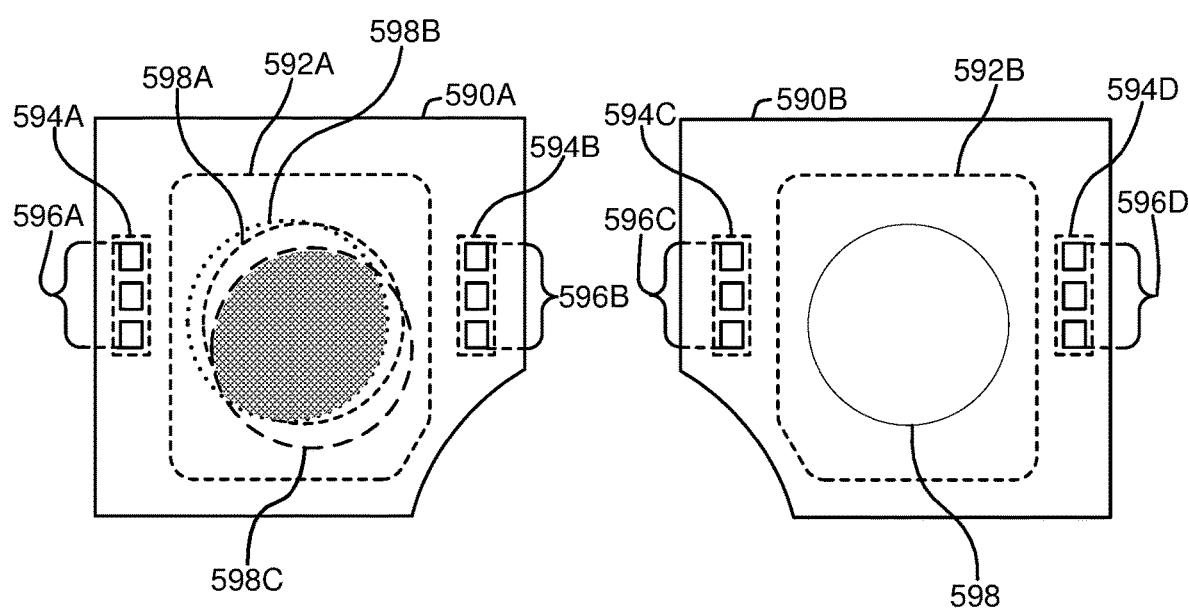
FIG. 5C is a top view of a display device, in accordance with an embodiment.

FIG. 5C is a top view of a display system (e.g., an NED), in accordance with an embodiment. The NED 570 in FIG. 9A may include a pair of waveguide configurations. Each waveguide configuration projects images to an eye of a user. In some embodiments not shown in FIG. 5C, a single waveguide configuration that is sufficiently wide to project images to both eyes may be used. The waveguide configurations 590A and 590B may each include a decoupling area 592A or 592B. In order to provide images to an eye of the user through the waveguide configuration 590, multiple coupling areas 594 may be provided in a top surface of the waveguide of the waveguide configuration 590. The coupling areas 594A and 594B may include multiple coupling elements to interface with light images provided by a light emitter array set 596A and a light emitter array set 596B, respectively. Each of the light emitter array sets 596 may include a plurality of monochromatic light emitter arrays, as described herein. As shown, the light emitter array sets 596 may each include a red light emitter array, a green light emitter array, and a blue light emitter array. As described herein, some light emitter array sets may further include a white light emitter array or a light emitter array emitting some other color or combination of colors.

The right eye waveguide 590A may include one or more coupling areas 594A, 594B, 594C, and 594D (all or a portion of which may be referred to collectively as coupling areas 594) and a corresponding number of light emitter array sets 596A, 596B, 596C, and 596D (all or a portion of which may be referred to collectively as the light emitter array sets 596). Accordingly, while the depicted embodiment of the right eye waveguide 590A may include two coupling areas 594 and two light emitter array sets 596, other embodiments may include more or fewer. In some embodiments, the individual light emitter arrays of a light emitter array set may be disposed at different locations around a decoupling area.

For example, the light emitter array set 596A may include a red light emitter array disposed along a left side of the decoupling area 592A, a green light emitter array disposed along the top side of the decoupling area 592A, and a blue light emitter array disposed along the right side of the decoupling area 592A. Accordingly, light emitter arrays of a light emitter array set may be disposed all together, in pairs, or individually, relative to a decoupling area.

The left eye waveguide 590B may include the same number and configuration of coupling areas 594 and light emitter array sets 596 as the right eye waveguide 590A, in some embodiments. In other embodiments, the left eye waveguide 590B and the right eye waveguide 590A may include different numbers and configurations (e.g., positions and orientations) of coupling areas 594 and light emitter array sets 596. Included in the depiction of the left waveguide 590A and the right waveguide 590B are different possible arrangements of pupil replication areas of the individual light emitter arrays included in one light emitter array set 596. In one embodiment, the pupil replication areas formed from different color light emitters may occupy different areas, as shown in the left waveguide 590A. For example, a red light emitter array of the light emitter array set 596 may produce pupil replications of a red image within the limited area 598A. A green light emitter array may produce pupil replications of a green image within the limited area 598B. A blue light emitter array may produce pupil replications of a blue image within the limited area 598C. Because the limited areas 598 may be different from one monochromatic light emitter array to another, only the overlapping portions of the limited areas 598 may be able to provide full-color pupil replication, projected toward the eyebox 230. In another embodiment, the pupil replication areas formed from different color light emitters may occupy the same space, as represented by a single solid-lined circle 598 in the right waveguide 590B.

In one embodiment, waveguide portions 590A and 590B may be connected by a bridge waveguide (not shown). The bridge waveguide may permit light from the light emitter array set 596A to propagate from the waveguide portion 590A into the waveguide portion 590B. Similarly, the bridge waveguide may permit light emitted from the light emitter array set 596B to propagate from the waveguide portion 590B into the waveguide portion 590A. In some embodiments, the bridge waveguide portion may not include any decoupling elements, such that all light totally internally reflects within the waveguide portion. In other embodiments, the bridge waveguide portion 590C may include a decoupling area. In some embodiments, the bridge waveguide may be used to obtain light from both waveguide portions 590A and 590B and couple the obtained light to a detection (e.g. a photodetector), such as to detect image misalignment between the waveguide portions 590A and 590B.

Light Emitter Arrays with Reduced Resolution

Figure 6A:
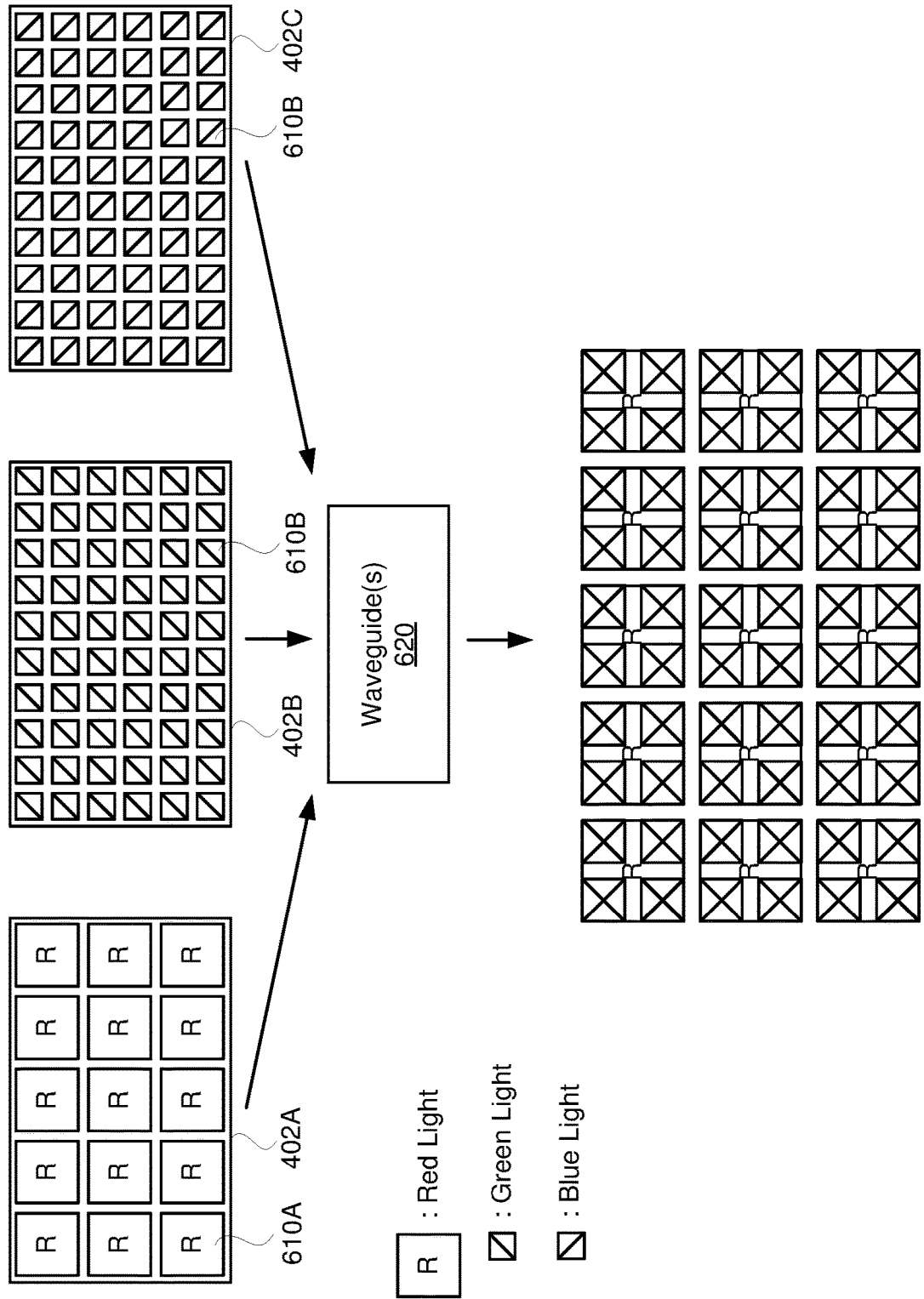
FIG. 6A is a conceptual diagram illustrating an example architecture of light emitter arrays and an image formation based on the architecture, in accordance with an embodiment.

FIG. 6A is a conceptual diagram illustrating an example architecture of light emitter arrays 402 and an image formation based on the architecture, in accordance with an embodiment. In some cases, the conceptual diagram of FIG. 6A may correspond to FIGS. 4A through 4C in terms of the architecture and FIG. 5B in terms of the image formation.

A display device may combine light emitted from light emitter arrays associated with different color channels, such as color channels of primary colors, to form a full-color image. For example, in one embodiment, a display device may include a plurality of light emitter arrays 402A through 402C (which may be referred collectively to as "light emitter arrays 402" or individually to as "light emitter array 402"). Each light emitter array 402 may be associated with monochromatic light and include a plurality of light emitters 610A, 610B, or 610C (which may be referred collectively to as "light emitters 610" or individually to as "light emitter 610"). Each of the light emitters may correspond to a structure shown in FIG. 4D or 4E or may correspond to other types of light emitter. The light emitter arrays 402 may be spaced apart from each other in the display device. For example, in one embodiment, the three light emitter arrays 402 may be mounted on a single substrate such as a circuit board but are located at different locations of the substrate. In another embodiment, the three light emitter arrays 402 may be mounted on different circuit boards.

Light emitters of different colors are represented by different symbols in FIG. 6A. The light emitter array 402A may include red light emitters 610A. Each of the red light emitters 610A is represented by a square with a capital letter "R" inside the light emitter array 402A. The light emitter array 402B may include green light emitters 610B. Each of the green light emitters 610B is represented by a square with a bottom-left-to-top-right diagonal line. Likewise, the light emitter array 402C may include blue light emitters 610C. Each of the blue light emitters 610C is represented by a square with a top-left-to-bottom-right diagonal line. While, for simplicity, the light emitters 610 are illustrated in FIG. 6A as having a square shape, the light emitters 610 may take different shapes in various embodiments. For example, light emitters 610 may be circular. Also, while each light emitter 610 is shown as being spaced apart from other light emitters 610 within an array, in some embodiments the light emitters 610 may be immediately adjacent to each other.

In one embodiment, each light emitter array 402 may have different spatial resolutions. For example, each of the first light emitters 610A may have a first size that is larger than each of the second light emitters 610B that may have a second size. Because of the size difference, the first light emitter array 402A may have a first number of light emitters 610A while the second light emitter array 402B may have a second number of light emitters 610B. The first number is smaller than the second number. Hence, the first light emitter array 402A may have a first spatial resolution that is lower than the second resolution of the second light emitter array 402B. In the particular example shown in FIG. 6A, the green light emitter array 402B has twice the number of light emitters of the red light emitter array 402A in both the lateral and the longitude directions (i.e., twice the number of rows and columns). Hence, the red light emitter array 402A may correspond to a quarter of the spatial resolution of the green light emitter array 402B. The third light emitter array 402C may have a third number of light emitters 610C. In various embodiments, the third number may be equal to the first number or the second number. In one embodiment, the third number may be different from both the first and the second number so that the third light emitter array 402C corresponds to a third resolution that is different from the first and second resolutions. In FIG. 6A, while the red light emitters are illustrated as having a larger size than the green and blue light emitters, in other embodiments other color channels may be associated with a reduced spatial resolution instead of the red color channel. For example, in one embodiment, both red and blue color channels are associated with a reduced spatial resolution.

Since the light emitters 610 may have different sizes, light emitted by the light emitters 610 may have different cross-sectional areas that are proportional to the sizes of the light emitters 610. For example, a first light may have a first cross section that is proportional to the first size when the first light emerges from the light emitter 610A. Likewise, a second light may have a second cross section that is proportional to the second size when the second light emerges from the light emitter 610A. Since the first light emitter 610A is larger than the second light emitter 610B, the cross section of the first light is also larger than the cross section of the second light when an image is formed.

As the light emitted from different light emitter arrays 402 reaches one or more waveguides 620, the waveguide(s) 620 may converge the light emitted from different light emitter arrays 402 to form an image 630. An example way to converge and propagate light in a waveguide is discussed in FIG. 5B, although other ways to converge and propagate light is also possible in accordance with various embodiments. The image 630 may include light emitted from light emitters 610 of different colors (such as three primary colors R, G, and B) that spatially overlaps to form a full-color image. The image 630 may be divided into a plurality of spatial locations.

Figure 6B:
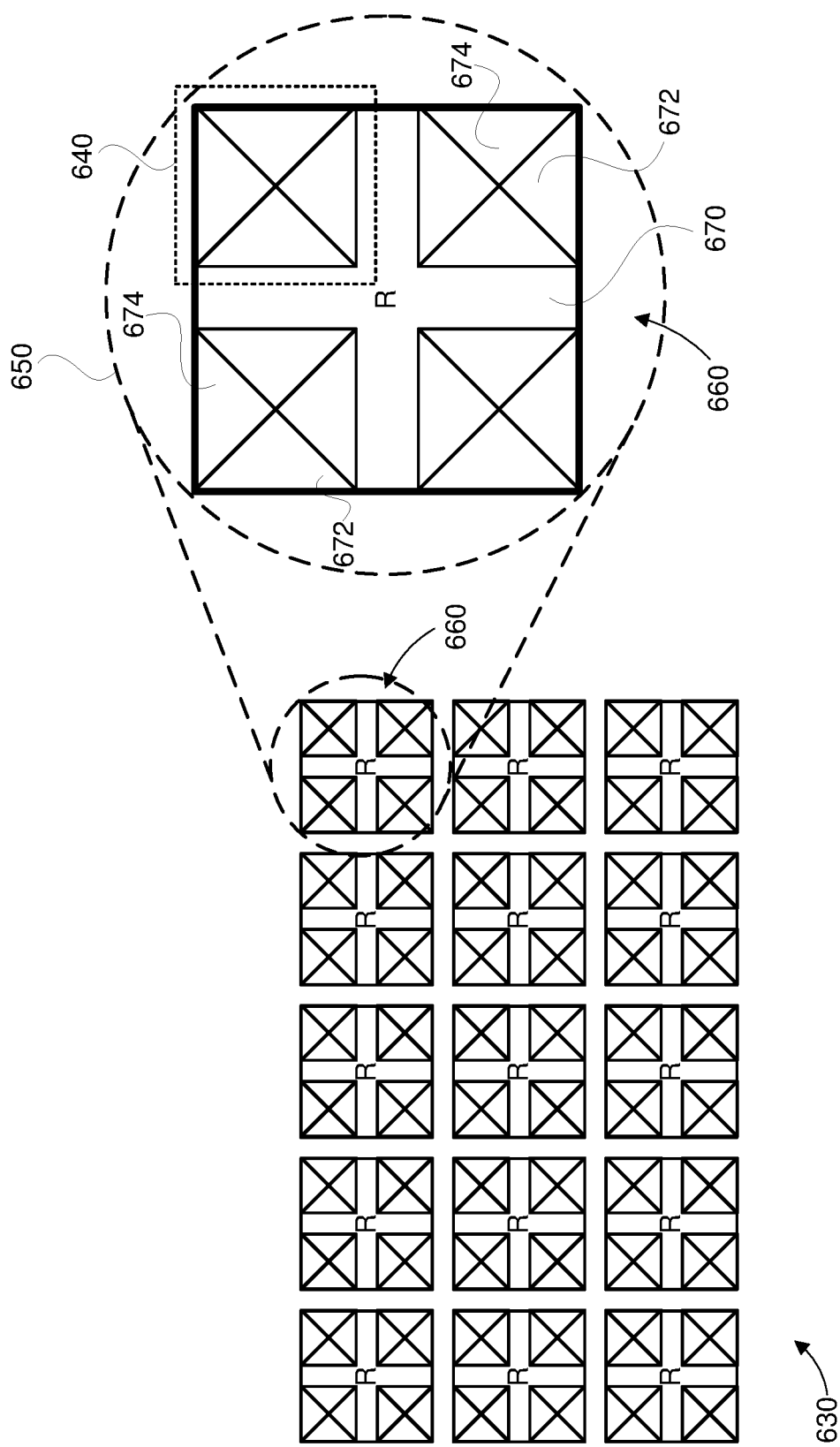
FIG. 6B is a conceptual diagram of an image, in accordance with an embodiment.

FIG. 6B is a conceptual diagram illustrating the spatial regions of an image formed, in accordance with an embodiment. In FIG. 6B, the spatial overlapping of light is illustrated. Similar to the illustration of various light emitter arrays 402 at the top of FIG. 6A, the light of different colors is represented by different square shapes for simplicity, even though each light may have a circular cross section. The red light is illustrated as squares with the capital letters "R" in the middle; the green light is illustrated as squares with bottom-left-to-top-right diagonal lines; the blue light is illustrated as squares with top-left-to-bottom-right diagonal lines. In the particular embodiment shown in FIG. 6A, the green light emitters 610B and the blue light emitters 610C have the size. Correspondingly, the green light and the blue light shown in FIG. 6B may have a similar cross-sectional size. The green light beams and the blue light beams are spatially overlapped so that the small squares in the image 630 are illustrated as having both diagonal lines in the squares. Since red light emitters 610A are larger than the green and blue light emitters 610B and 610C, the corresponding red light also has a larger cross-sectional area than the green and blue light. The cross sections of the red light are illustrated by the larger squares in FIG. 6B.

A full-color image may be formed by spatially overlapping the light from various light emitters of different colors at different spatial regions. Referring to the inset 650, a spatial region 660 of the image 630 is enlarged in FIG. 6B. The spatial region 660 includes red light 670 (represented by a large square with a bolded outline and a capital letter "R"), a plurality of green light regions 672 and a plurality of blue light regions 674. The green light regions 672 and blue light regions 674 are illustrated as completely overlapped in FIG. 6B, although in various embodiments the two light beams do not need to be completely overlapped. In the spatial region 660, light emitted by a first light emitter of a first color spatially overlaps with light emitted by a plurality of second light emitters of a second color (e.g., a red light region spatially overlaps with multiple green light regions or blue light regions). In an alternative embodiment, the size of the blue light emitters 610C may be of the size of the red light emitters 610A. In such case, in the spatial region 660, light emitted by a first light emitter of the first color may spatially overlap with light emitted by a third light emitter of the third color and with light emitted by a plurality of second light emitters of the second color. While first, second, and third are respectively associated with red, green, and blue in FIGS. 6A and 6B, this particular order is merely an example.

Also, while FIG. 6B illustrates that some light regions completely overlap, in other embodiments only portions of one or more light regions spatially overlap with each other.

Based on how regions of different colors of light are distributed in an image, an image 630 may include a plurality of pixel locations 640. In other words, a spatial location of the image 630 may be described in terms of a plurality of pixel locations 640. An example pixel location 640 is shown in the inset 650. In one case, the number of pixel locations 640 in the image 630 may correspond to the number of light emitters 610 of the light emitter array 402 that has the highest resolution among the plurality of light emitter arrays 402. For example, in FIG. 6A, both the green and blue light emitter arrays 402B and 402C correspond to the highest resolution among different light emitter arrays 402. Hence, a pixel location may correspond to a spatial location where a single green light region 672 or a single blue light region 674 is located. In the image 630, the pixel location 640 has a portion that has a first light emitted from a first light emitter 610A of the first color (e.g., the red light 670) spatially overlapping with a second light emitted from a second light emitter (e.g., the green light 672) and with a third light emitted from a third light emitter (e.g., the blue light 674). Because the light beam of the first light has a large cross section, in the pixel location 640 only a portion of the red light 670 spatially overlaps with the green light 672 and blue light 674. In one embodiment, the light of all three primary colors spatially overlaps with each other in at least a portion of the pixel location 640. Hence, at least a portion of the pixel location 640 is a full-color region that can display any color that is defined by the combinations of three primary colors.

In one case, a spatial location of 660 may include a plurality of pixel locations 640. Each of the pixel locations 640 may be projected with an entire portion of light from one of the second light emitters 610B and a fraction of light from one of the first light emitters 610A. Put differently, the entire portion of light from one of the first light emitters 610A may be projected to a plurality of pixel locations 640 while the entire portion of light from one of the second light emitters 610B may be projected to a single pixel location 640. Depending on the size of the third light emitters 610C, the light emitted from the third light emitters 610C may be projected to a single pixel location 640 or multiple pixel locations 640.

Anti-Aliasing Filter

Figure 7:
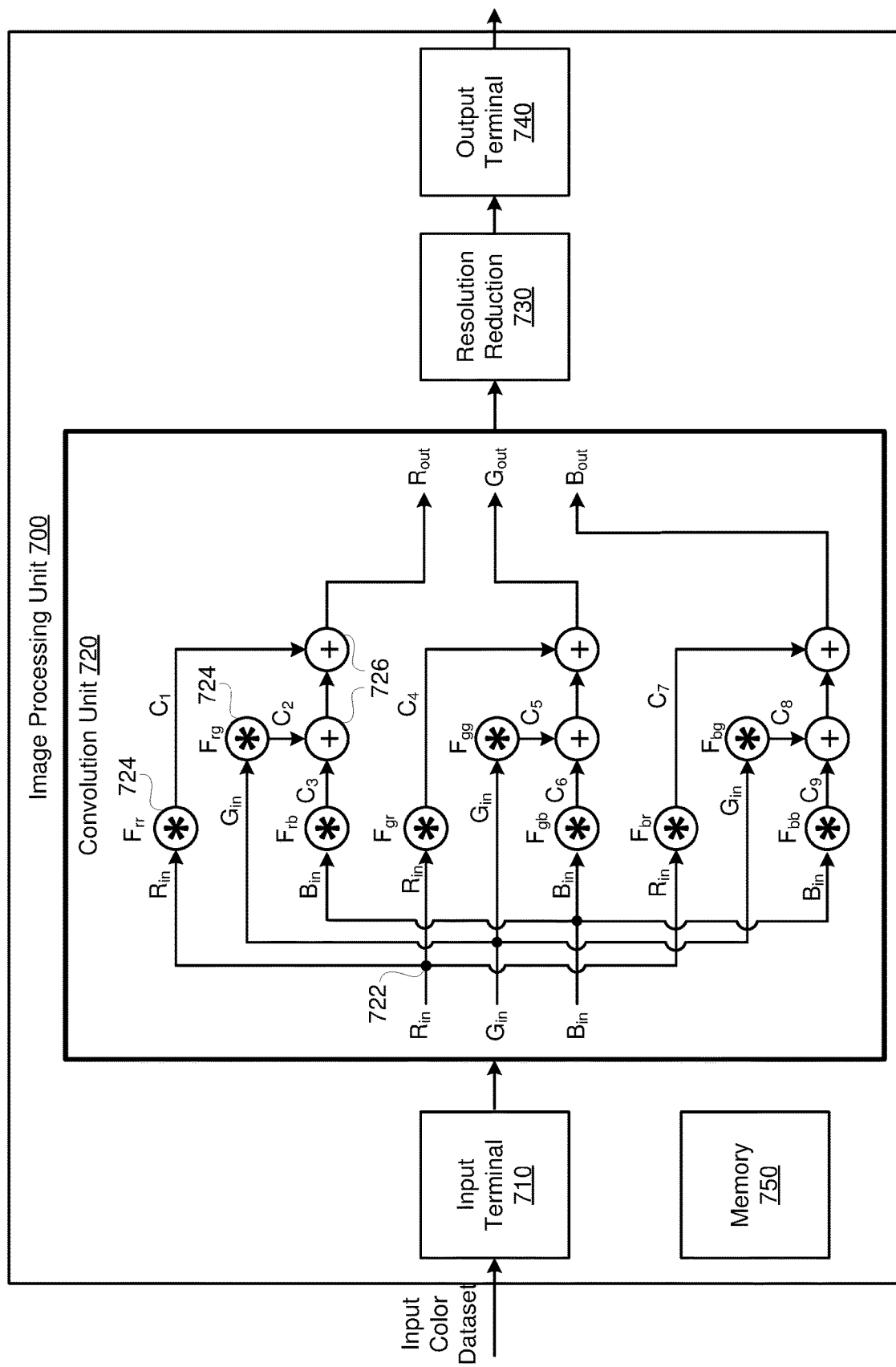
FIG. 7 is a block diagram depicting an image processing unit, in accordance with an embodiment.

FIG. 7 is a block diagram of an example image processing unit 700 that may be used to process image data for a display device with a reduced resolution in one or more color channels, in accordance with an embodiment. The image processing unit 700 may include, among other components, an input terminal 710, a convolution unit 720, a resolution reduction unit 730, an output terminal 740, and a memory 750. Different components of the image processing unit 700 may be implemented as hardware in the form of a circuit, firmware, software, and any combination thereof. In some embodiments, the image processing unit 700 may be a part of a graphics processing unit (GPU) of the display device. In another embodiment, the image processing unit 700 may be an independent circuit that processes image data transmitted from the GPU of a display device.

The input terminal 710 may be a circuit that receives an input color dataset from a data source. The input terminal 710 may include data registers or buffers that store the input color dataset for further processing. Alternatively, or additionally, the input terminal 710 may transmit the input color dataset to the memory 750 for storage. An input color dataset may include values of different colors intended to be displayed in an image for different pixel locations of the image. The input color dataset may be divided into different subsets of data value, each subset corresponding to values of a single color (e.g., in the form of 8-bit, 10-bit, or 12-bit grey scale) at different pixel locations of an image. For example, an input color dataset may include a first input data value subset that corresponds to a first light emitter array 402A (shown in FIG. 6A) that emits light of a first color (e.g., red). The input color dataset may also include a second input data value subset that corresponds to a second light emitter array 402B that emits light of a second color (e.g., green). The input color dataset may further include a third input data value subset that corresponds to a third light emitter array 402C that emits light of a third color (e.g., blue). In one embodiment, each input data value subset may include values for a full spatial resolution light emitter array, but the display device has at least one of the light emitter arrays that corresponds to a reduced resolution, as discussed in FIGS. 6A and 6B. Put differently, in one embodiment, for at least one of the color channels, the number of values in the input color dataset may be more than the number of the light emitters in an array of that color. For example, both red and blue color channels may correspond to reduced resolutions and the extents of resolution reduction in the two channels may be the same or different.

The image processing unit 700 performs image processing to reduce the perceived effect on users as a result of one or more color channels being associated with a reduced spatial resolution. The perceived resolution of a display device may depend on the spatial frequency of the display image. Human eyes are sensitive to changes in image pattern to a certain level that may be expressed in terms of angular resolution. For example, some human eyes are only sensitive to an angular resolution of up to about 0.02 to 0.03 degrees. Instead of being expressed in the RGB space, a color may also be expressed in the opponent space in terms of a luminance channel, L, a blue-yellow chrominance channel $O_1$, and a red-green chrominance channel $O_2$. Normally, human eyes have a higher spatial frequency sensitivity in the luminance channel than the chrominance channels. For example, human eyes may be able to decide up to 60 cycles per degree in the luminance channel. The image processing unit 700 adjusts the data values in the input color dataset to reduce the differences between the spatial frequencies of full-resolution luminance and chrominance channels represented by the data values in the input color dataset and the spatial frequencies of luminance and chrominance represented by an output color dataset that corresponds to one or more light emitter arrays that have a reduced spatial resolution.

By way of example, the difference between the input color dataset and the output color dataset may be reduced in the Fourier-opponent space after a filter that is designed based on the human sensitivities to the spatial frequencies of the luminance and chrominance channels is applied. The filter may be determined based on the following calculation. For example, an input color dataset may include a plurality of sets of RGB pixel values. The set of RGB pixel values may be converted to frequency domain such as by applying a discrete Fourier transform to the RGB pixel values. A transformation may be applied to the result to convert the RGB values in the frequency domain to opponent space values in the frequency domain. A human visual system filter may be applied to the transformed values to generate filtered values. The human visual system filter may be a spatial frequency filter that is designed based on the target angular frequency sensitivity levels of human eyes and take both luminance sensitivity level and chrominance sensitivity levels into account. A desired output color dataset reduces the differences between the filtered values of the input color dataset and the filtered values of the output color dataset subject to the constraint that one or more primary color channel has a reduced spatial resolution. The difference may be expressed as the mean squared differences.

Mathematically, generating the output color dataset may be expressed by the following:

$$\min\{\|WCF\{x-1\}\|^2\} \; s. \; t. \; Ax=b \qquad (1)$$

In the above equation (1), x represents the RGB pixel values of the output color dataset. I represents the RGB pixel values of the input color dataset. F represents a discrete Fourier transform operation. C represents an RGB-to-opponent-space transformation. W represents a human visual system filter. Equation (1) may represent a reduction of mean square difference process that reduces the mean square difference between a version of transformed and filtered input color dataset and a version of transformed and filtered output color dataset. In some cases, not only the difference is reduced, Equation (1) may represent an optimization problem that attempts to minimize the difference. More specifically, the version of the input data values may be the input data values that are transformed into a frequency domain, converted to an opponent space, and filtered by a spatial frequency filter. Likewise, the version of the output data values may be the output data values transformed into the frequency domain, converted to the opponent space, and filtered by the spatial frequency filter.

The process to reduce the mean square difference may be subject to one or more constraints. In one embodiment, in equation (1), the process may be subject to a condition of Ax=b, in which A and b may represent any pixel constraints in each RGB color channel. For example, one constraint may be that one of the color channels may have a reduced spatial resolution compared to another color channel. This constraint may be expressed in the form of making a subset of the output data values for a color to have repeated values. The repeated values may correspond to a light emitter 610 having a larger size. For example, in the embodiment shown in FIG. 6A, a larger red emitter 610A may correspond to 2×2 smaller green emitters 610B. The constraint may make the output data values for the subset for the red color to include a value repeated four times for each red emitter 610A. Hence, at least half of the red subset of output data values are repeated values compared to the second subset of output data values. Put differently, the repeated values represent that the red light emitter array 402A has a reduced spatial resolution compared to the green emitter array 402B. In another embodiment, the constraint for a reduced resolution color channel may be expressed in the form of making a subset of the output data values for a color to have reduced numbers of output values. For example, since the red light emitter array 402A shown in FIG. 6A has a reduced spatial resolution, the subset of output color dataset for the red color may also have a reduced number of output values. This condition may be expressed as a constraint in the Equation (1).

In some embodiments, the Equation (1) may be solved algebraically or approximated to a closed-form solution, which may be represented as an anti-aliasing filter. For example, in one embodiment, the solution of Equation (1), which may be an anti-aliasing filter, may be expressed as an operation of two-dimensional convolutions by applying different convolution kernels to the input color dataset to generate the output color dataset. Mathematically, the anti-aliasing filter may be expressed as the following:

$$x = \begin{bmatrix} F_{rr} & F_{rg} & F_{rb} \\ F_{gr} & F_{gg} & F_{gb} \\ F_{br} & F_{bg} & F_{bb} \end{bmatrix} * \begin{bmatrix} R \\ G \\ B \end{bmatrix} \quad (2)$$

In the above equation (2), x represents the output color dataset. R is an input data value subset for the color red. For example, R may be an N×N matrix that includes the red values of the target pixel location and neighboring pixel locations that are covered by the convolution. Likewise, G and B are respectively input data value subsets for the color G and color B. The symbol * denotes convolution. Each of the $F_{xx}$ represents a convolution kernel. For example, $F_{rg}$ represents a convolution kernel that is applied to the green input data value subset to generate a convolution result that is used for generating an output data value subset for the red color. Likewise, $F_{gr}$ represents a convolution kernel that is applied to the red input data value subset to generate a convolution result that is used for generating an output data value subset for the green color. Each of the $F_{xx}$ convolution kernels may be an N×N matrix, such as a 5×5 matrix. Since a closed-form solution may exist, in one embodiment the image processing 700 directly applies the anti-aliasing filter to the input color dataset instead of carrying out an optimization process on the fly.

By way of example, the image processing unit 700 may apply the anti-aliasing filter in the form of convolution kernels on the input color dataset. The output color dataset for each color may be a combination of the convolution results of all input data values of all three colors. For example, for the generation of the output data value subset for the red color, the image processing unit 700 may convolve a first convolution kernel, $F_{rr}$, with a first input data value subset that includes red input values to generate a first convolution result. The image processing unit 700 may also convolve a second convolution kernel, $F_{rg}$, with a second input data value subset that includes green input values to generate a second convolution result. The image processing unit 700 may further convolve a third convolution kernel, $F_{rb}$, with a third input data value subset that includes blue input values to generate a third convolution result. The image processing unit 700 combines the first convolution result, the second convolution result, and the third convolution result to generate a first subset of output data values for the red color. The display device may use first subset of output data values to generate driving signals for the first light emitter array 402A shown in FIG. 6A. Mathematically, in one embodiment, the convolution and combination process for generating output values of a color (e.g. red) may be expressed as the following:

$$R_{out} = F_{rr} * R_{in} + F_{rg} * G_{in} + F_{rb} * B_{in} \quad (3)$$

In the equation (3) above, each of the $F_{xx}$, $R_{in}$, $G_{in}$, and $B_{in}$ may be an N×N matrix. In one embodiment, since the red color light emitter array 402A has a reduced spatial resolution, the values in the first subset of output data values are repeated to represent the reduced resolution. In another embodiment, the values in the first subset of output data values do not need to be repeated. The output may subsequently be downsampled to generate the number of output values that correspond to the number of light emitters.

An image processing unit 700 may repeat similar convolution and combination processes (whether sequentially or in parallel) to generate the output data values for the green color and the blue color. For example, for the generation of the output data value subset for the green color, the image processing unit 700 may convolve a fourth convolution kernel, $F_{gr}$, with the first input data value subset that includes red input values to generate a fourth convolution result. The image processing unit 700 may also convolve a fifth convolution kernel, $F_{gg}$, with the second input data value subset that includes green input values to generate a fifth convolution result. The image processing unit 700 may further convolve a sixth convolution kernel, $F_{gb}$, with the third input data value subset that includes blue input values to generate a sixth convolution result. The image processing unit 700 combines the fourth convolution result, the fifth convolution result, and the sixth convolution result to generate a second subset of output data values for the green color.

A group of convolution kernels for generating an output subset for a color may have values that are related to other kernels in the group to preserve the color balance of the output color values. For example, in one embodiment, the nine convolution kernels may be classified into three groups, each corresponding to an output color. To maintain the color balance of the output color, each group may include three convolution kernels that summed to an identity matrix. As such, the anti-aliasing filter does not shift the overall color balance of the output, but may re-distribute the some of the color values in a neighbor pixel region to try to reduce any differences in spatial frequencies of the actual output image compared to the desired image. Mathematically, in one embodiment, a group of convolution kernels for output values of a particular color may be expressed by the following relationship:

$$F_{xr} + F_{xg} + F_{xb} = \begin{bmatrix} 1 & 0 & 0 \\ 0 & \ddots & 0 \\ 0 & 0 & 1 \end{bmatrix} \quad (4)$$

In the equation (4) above, x may represent any output color such as r, g, or b.

Referring to the convolution unit 720, a schematic for the anti-aliasing filter is shown in FIG. 7. The convolution unit 720 may be implemented as a circuit, firmware run at a microcontroller or a specialized chip, software that is executable by a more generalized processor such as a graphics processing unit (GPU) or a central processing unit (CPU), or any combination thereof. In some embodiments, the convolution unit 720 may also be referred to as a convolution circuit or an anti-aliasing filter circuit. For discussion in FIG. 7, a circuit embodiment of the convolution unit 720 is discussed.

The convolution unit 720 may receive data values of the input color dataset from the input terminal 710. The input color dataset may be separated into three input data value subsets, $R_{in}$, $G_{in}$, and $B_{in}$. Each input data value subset may include color values at different pixel locations of an image and may correspond to one of the light emitter arrays 410 that emits light of a color. In one embodiment, each input data value subset may be duplicated in parallel for three different convolution operations. For example, the values in $R_{in}$ are duplicated at node 722 for three parallel processing. The convolution unit 720 may convolve each of the parallel subsets of data values with a convolution kernel at a convolution operator 724. For example, the convolution unit 720 may convolve a first convolution kernel $F_{rr}$ with a first input data value subset $R_{in}$ at a convolution operator 724. In a parallel operation, the convolution unit 720 may also convolve a second convolution kernel $F_{rg}$ with a second input data value subset $G_{in}$ at another convolution operator 724. Each convolution operator 724 may have a similar structure and may be a digital circuit that includes multipliers and adders that are designed and pipelined for performing a large number of matrix multiplications. In some embodiments, the matrix values in each convolution kernel $F_{xx}$ may be saved in the registers of the convolution operators 724. In other embodiments, the values of the convolution kernel $F_{xx}$ may be stored in the memory 750.

After convolutions are calculated, the convolution unit 720 generates a plurality of convolution result such as a first convolution result $C_1$, a second convolution result $C_2$, etc. The convolution results with respect to an output data value subset of a color may be combined by one or more adders 726. The convolution results may be added in any order. For example, in the embodiment shown in FIG. 7, the second convolution result $C_2$ is added to the third convolution result $C_3$ before the first convolution result $C_1$ is added. In other embodiments the first convolution result $C_1$ may be added first or all three convolution results may be added together.

The combined result may be an output data value subset. For example, the first, second, and third convolution results $C_1$, $C_2$, and $C_3$ may be combined to generate a first output data value subset $R_{out}$. Put differently, in one embodiment, each output data value subset corresponding to a primary color channel may be derived based on the input data values of all three primary colors because the combined result may be based on convolutions of input data values of all three colors. The convolution unit 720 may repeat similar convolution and combination processes for the second and third output data value subsets Gout and Bout.

While the convolution unit 720 in the embodiment shown in FIG. 7 may carry out the convolution operations for different color values largely in parallel, in other embodiments the convolution unit 720 may also carry some of the operations sequentially. For example, the size of the convolution unit 720 may be reduced to a third of the size and the output data value subset Rout, Gout and Bout may be generated sequentially.

The resolution reduction unit 730 may be a circuit, firmware, software, or any combination thereof. The resolution reduction unit 730 may carry out downsampling to reduce the number of output values in one or more output data value subsets Rout, Gout and Bout. For example, in an embodiment shown in FIG. 6A, the size of the red light emitters 610A is increased so that the number of the red light emitters 610A in the array 402A is half of the number of green light emitters 610B in the array 402B in both the longitudinal and lateral directions. The convolution unit 720 outputs data value subsets that may have the same number of values as the input color dataset. Since the red light emitter array 402A includes a reduced number of red light emitters 610A, only one out of every several red values is needed to drive a red light emitter 610A. The resolution reduction unit 730 may downsample the output data value subset Rout by taking every N-th values in the subset Rout. Other ways to carry out downsampling are also possible. For example, the downsampling may include one or more of binning, skipping, striding, finite impulse response (FIR) filtering, etc. The number of N may correspond to the reduction in the number of light emitters 610 in a reduced resolution array 402. For example, if the number of light emitters 610 is reduced by a factor of N in both longitudinal and lateral directions, the resolution reduction unit 730 may downsample the output data value subset by a factor of N in both longitudinal and lateral directions.

In some embodiments, the resolution reduction unit 730 is not used so that the number of data values in each color channel is the same. This may allow an easier downstream data signal processing. In another embodiment, the convolution unit 720 directly produce reduced numbers of data values compared to the input color data set.

The output terminal 740 may transmit the output color dataset to other processing units in the display device for other downstream image processing operations. In one embodiment, the output terminal 740 may be connected to the driving circuit 370 of the display panel 380 (shown in FIG. 3B). The output color dataset may be modulated and converted to driving signals to drive different light emitter arrays.

Example Process for Image Processing

Figure 8:
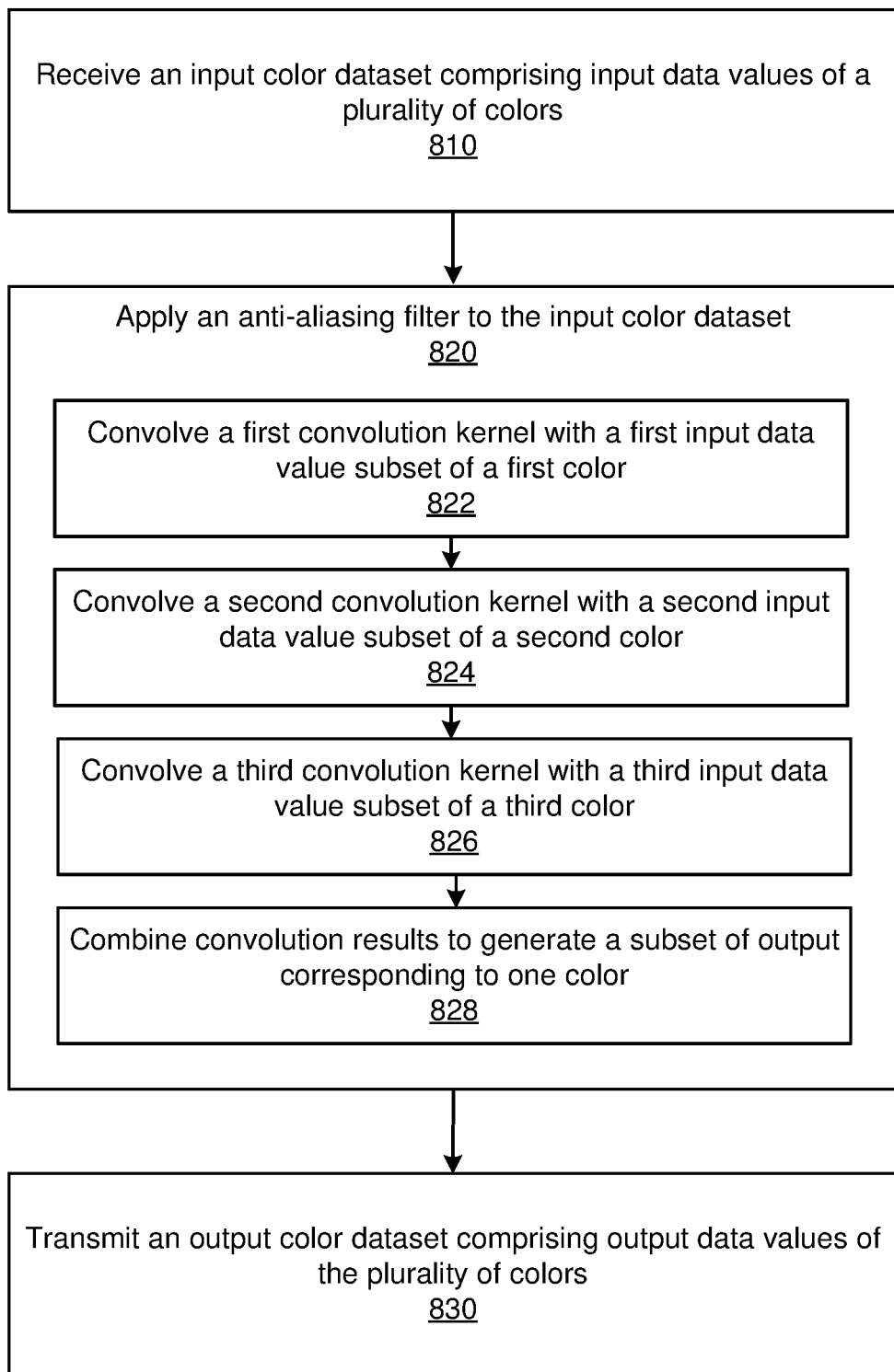
FIG. 8 is a flowchart depicting a process of operating a display device, in accordance with an embodiment.

FIG. 8 is a flowchart depicting a process of operating a display device, in accordance with an embodiment. The process may be operated by an image processing unit (e.g., a general processor coupled with instructions, a dedicated circuit, or a combination thereof) of the display device. In one case, the process may be operated at the GPU of the display device. In some embodiments, a display device may process color data values image by image. At a given time, the display device may receive 810 an input color dataset that includes input data values of a plurality of colors at different pixel locations of an image. For example, the input color dataset may include a first input data value subset corresponding to a first light emitter array that emits light of a first color and a second input data value subset corresponding to a second light emitter array that emits light of a second color. The first light emitter array may have a reduced spatial resolution compared to the second light emitter array. In some embodiments, the input color dataset may additionally include a third input data value subset corresponding to a third light emitter array that emits light of a third color. The three colors may be three primary colors that, in combination, may generate full color.

The display device may apply 820 an anti-aliasing filter to the input color dataset. The anti-aliasing filter may include multiple convolution kernels and is designed to re-distribute some of the color values to reduce the perceived difference in spatial frequencies between an image produced by color arrays with one or more reduced resolution color channel and the desired image defined by the input color dataset.

The application of the anti-aliasing filter may include several sub-steps. For example, the display device may convolve 822 a first convolution kernel with a first input data value subset of the first color to generate a first convolution result. The display device may also convolve 824 a second convolution kernel with a second input data value subset of the second color to generate a second convolution result. The display device may further convolve 826 a third convolution kernel with a third input data value subset of the third color to generate a third convolution result. The display device may combine 828 at least the first convolution result and the second convolution result to generate a first subset of output data values that correspond to the first light emitter array. In the case where a third convolution result is also generated, the combination may also include the third convolution result.

The display device may repeat similar convolution and combination processes to generate other subsets of output data values that correspond to other light emitter arrays that emit light of different colors. For example, the first subset of output data values may include red output data values. For the second subset of output data values that include green output data values, the display device may convolve a fourth convolution kernel with the first input data value subset of red color to generate a fourth convolution result. The display device may also convolve a fifth convolution kernel with the second input data value subset of green color to generate a fifth convolution result. The display device may further convolve a sixth convolution kernel with the third input data value subset of blue color to generate a sixth convolution result. The display device may combine the fourth, fifth, and sixth convolution results to generate the second subset of output data values for the green light emitter array. The third subset of output data values for the blue light emitter array may be generated in a similar manner. The subsets of output data values may be downsampled for one or more color channels that are associated with reduced resolution.

The display device may transmit 830 an output color dataset to other components of the display device for downstream data processing or to drive the display panel circuit. The output color dataset may include the output data values of different colors. For example, the output color dataset may include the first, second, and third subsets of output values combined.

While in this disclosure red, green, and blue are used as the primary colors in various example embodiments, other embodiments may use other colors. Also, a display device may use more or fewer than three primary colors. For example, in one embodiment, a display device may use four primary colors and the anti-aliasing filter may include 16 convolution kernels.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device, comprising:
    a plurality of first light emitters each having a first size, the plurality of first light emitters configured to emit light of a first color;
    a plurality of second light emitters each having a second size smaller than the first size, the plurality of second light emitters configured to emit light of a second color, the plurality of second light emitters spatially separated from the plurality of first light emitters, the quantity of the plurality of first light emitters smaller than the quantity of the plurality of second light emitters;
    a plurality of third light emitters each having a third size smaller than the first size, the plurality of third light emitters configured to emit light of a third color, the plurality of third light emitters spatially separated from the plurality of first light emitters and the plurality of second light emitters; and
    one or more waveguides configured to converge the light emitted from the plurality of first light emitters, the light emitted from the plurality of second light emitters, and the light from the plurality of third light emitters to form an image, (i) a set of multiple pixels of the image formed by the light from a single first light emitter, the light from multiple second light emitters, and the light from multiple third light emitters, and (ii) each pixel in the set formed by the light from a different second light emitter overlapping with the light from a different third light emitter at a majority of the pixel and formed by the light from the same single first light emitter shared by the multiple pixels in the set, at least a portion of the same single first light emitter overlapping with the light from the second light emitter and the third light emitter at the majority of the pixel.

2. The display device of claim 1, wherein the plurality of the first light emitters has a first spatial resolution and the plurality of the second light emitters has a second spatial resolution higher than the first spatial resolution.

3. The display device of claim 1, wherein the first, second, and third colors correspond to three primary colors.

4. The display device of claim 3, wherein each pixel in the set is a full color region that is formed from the three primary colors by spatially overlapping the light from the first, the second, and the third light emitters.

5. The display device of claim 1, wherein the plurality of first light emitters are arranged in a first light emitter array and the plurality of second light emitters are arranged in a second light emitter array.

6. The display device of claim 5, wherein the first light emitter array is monochromatic with respect to the first color and the second light emitter is monochromatic with respect to the second color.

7. The display device of claim 5, wherein the first light emitter array is spaced apart from the second light emitter array.

8. The display device of claim 1, wherein each pixel in the set is projected with light from one of the second light emitters and a portion of light from one of the first light emitters.

9. The display device of claim 1, further comprising:
    an image processing unit configured to apply an anti-aliasing filter to color datasets for the plurality of the first light emitters and the plurality of the second light emitters.

10. The display device of claim 9, wherein the anti-aliasing filter generates repeated output values for the first color, the repeated output values corresponding to one of the plurality of the first light emitters.

11. The display device of claim 1, wherein:
    the plurality of first light emitters are arranged in a first light emitter array having a first spatial resolution;
    the plurality of second light emitters are arranged in a second light emitter array having a second spatial resolution higher than the first spatial resolution; and
    a pixel location of the image is formed by spatially overlapping a portion of the light from one of the first light emitters with the light from one of the second light emitters.

12. The display device of claim 11, wherein the plurality of third light emitters have the second spatial resolution.

13. The display device of claim 11, further comprising:
    an image processing unit configured to apply an anti-aliasing filter to color datasets for the plurality of the first light emitters and the plurality of the second light emitters.

14. The display device of claim 13, wherein the anti-aliasing filter generates repeated output values for the first color, the repeated output values representing that the first light emitter array has the first spatial resolution that is lower than the second spatial resolution.

15. The display device of claim 1, wherein the second size is the same as the third size.

16. A method, comprising:

emitting light of a first color from a plurality of first light emitters each having a first size;

emitting light of a second color from a plurality of second light emitters each having a second size smaller than the first size, the plurality of second light emitters spatially separated from the plurality of first light emitters, the quantity of the plurality of first light emitters smaller than the quantity of the plurality of the second light emitters;

emitting light of a third color from a plurality of third light emitters each having a third size smaller than the first size, the plurality of third light emitters spatially separated from the plurality of first light emitters and the plurality of second light emitters; and converge, via one or more waveguides, the light emitted from the plurality of first light emitters, the light emitted from the plurality of second light emitters, and the light from the plurality of third light emitters to form an image, (i) a set of multiple pixels of the image formed by the light from a single first light emitter, the light from multiple second light emitters, and the light from multiple third light emitters, and (ii) each pixel in the set formed by the light from a different second light emitter overlapping with the light from a different third light emitter at a majority of the pixel and formed by the light from the same single first light emitter shared by the multiple pixels in the set, at least a portion of the same single first light emitter overlapping with the light from the second light emitter and the third light emitter at the majority of the pixel.

17. The method of claim 16, wherein the plurality of the first light emitters has a first spatial resolution and the plurality of the second light emitters has a second spatial resolution higher than the first spatial resolution.

18. The method of claim 16, further comprising:

applying an anti-aliasing filter to color datasets for operating the plurality of the first light emitters and the plurality of the second light emitters.

19. The method of claim 18, wherein the anti-aliasing filter generates repeated output values for the first color.

* * * * *